(12) United States Patent
Liu et al.

(10) Patent No.: US 9,614,695 B2
(45) Date of Patent: Apr. 4, 2017

(54) INTRA-FREQUENCY INTERFERENCE CANCELLATION METHOD, APPARATUS, AND SYSTEM

(71) Applicant: HUAWEI TECHNOLOGIES CO., LTD., Shenzhen (CN)

(72) Inventors: Yu Liu, Chengdu (CN); Cheng Hong, Chengdu (CN); Meng Cai, Chengdu (CN); Hongli Jiang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/280,046

(22) Filed: Sep. 29, 2016

(65) Prior Publication Data

US 2017/0019274 A1    Jan. 19, 2017

Related U.S. Application Data

(63) Continuation of application No. PCT/CN2014/074864, filed on Apr. 4, 2014.

(51) Int. Cl.
*H04B 7/04* (2006.01)
*H04L 25/03* (2006.01)
(Continued)

(52) U.S. Cl.
CPC .......... *H04L 25/03* (2013.01); *H04B 1/0475* (2013.01); *H04B 7/0469* (2013.01);
(Continued)

(58) Field of Classification Search
CPC ..... H04L 25/03; H04L 1/0475; H04L 7/0469; H04L 5/0048; H04L 25/08; H04L 5/04
(Continued)

(56) References Cited

U.S. PATENT DOCUMENTS

| 6,141,539 A | 10/2000 | Marino |
| 2009/0103720 A1* | 4/2009 | Karayil Thekkoott Narayanan ........... H01Q 9/0407 380/34 |

(Continued)

FOREIGN PATENT DOCUMENTS

| CN | 100385735 | 4/2008 |
| CN | 101562504 | 10/2009 |

(Continued)

OTHER PUBLICATIONS

International Search Report dated Jan. 15, 2015 in corresponding International Application No. PCT/CN2014/074864.*

(Continued)

*Primary Examiner* — Daniel Washburn
(74) *Attorney, Agent, or Firm* — Staas & Halsey LLP

(57) ABSTRACT

The present invention provides a method. The method includes: performing coupling to acquire a first reference signal and a second reference signal from a transmit signal transmitted on a same transmit link at a transmit end; performing signal recombination according to the first reference signal and the second reference signal, to obtain a first interference cancellation signal and a second interference cancellation signal; enabling the first interference cancellation signal to pass through a simulated interference channel, and enabling the second interference cancellation signal to pass through the simulated interference channel; and coupling and output, to a same receive link at the local receive end, the first interference cancellation signal and the second interference cancellation signal that have passed through the simulated interference channel, and combining the first interference cancellation signal and the second interference cancellation signal with a signal received by the local receive end.

20 Claims, 12 Drawing Sheets

(51) Int. Cl.
*H04L 25/08* (2006.01)
*H04B 1/04* (2006.01)
*H04L 5/00* (2006.01)
*H04L 5/04* (2006.01)

(52) U.S. Cl.
CPC ............ *H04L 5/0048* (2013.01); *H04L 25/08* (2013.01); *H04L 5/04* (2013.01)

(58) Field of Classification Search
USPC ................................................ 375/260, 295
See application file for complete search history.

(56) References Cited

U.S. PATENT DOCUMENTS

| | | | |
|---|---|---|---|
| 2010/0136916 | A1 | 6/2010 | Kawai |
| 2012/0262336 | A1 | 10/2012 | Yamamoto et al. |
| 2012/0315865 | A1* | 12/2012 | Zhang ...................... H04B 7/10 455/114.2 |
| 2014/0198867 | A1* | 7/2014 | Sturkovich ............. H04L 27/02 375/261 |
| 2014/0247863 | A1* | 9/2014 | Li ............................ H04B 7/10 375/233 |
| 2015/0048977 | A1* | 2/2015 | Khandani ................ H01Q 3/46 342/385 |
| 2015/0295308 | A1* | 10/2015 | Liu ........................ H04B 15/00 343/841 |

FOREIGN PATENT DOCUMENTS

| | | | |
|---|---|---|---|
| CN | 101652970 | | 2/2010 |
| CN | 101800678 | | 8/2010 |
| CN | 102598560 | | 7/2012 |
| CN | 102710569 | | 10/2012 |
| CN | 102833199 | * | 12/2012 |
| CN | 102833199 A | * | 12/2012 |
| CN | 103338172 | | 10/2013 |
| CN | 103427874 | | 12/2013 |
| JP | 2000165339 | | 6/2000 |
| WO | WO2011148341 | | 12/2011 |
| WO | WO2015149373 | * | 10/2015 |

OTHER PUBLICATIONS

International Search Report, dated Jan. 15, 2015, in International Application No. PCT/CN2014/074864 (13 pages).

Office Action, dated Jul. 28, 2016, in Chinese Application No. 201480000695.1 (5 Pages).

*Design of a cross polarization interference cancellation algorithm*, Journal of Anhui Vocational College of Electronics & Information Technology, vol. 11, No. 62, pp. 9-12.

*Performance of cross polarization interference cancelation in non-linear effect*, Journal of Hefei University of Technology, vol. 36, No. 8, pp. 959-963 Abstract.

* cited by examiner

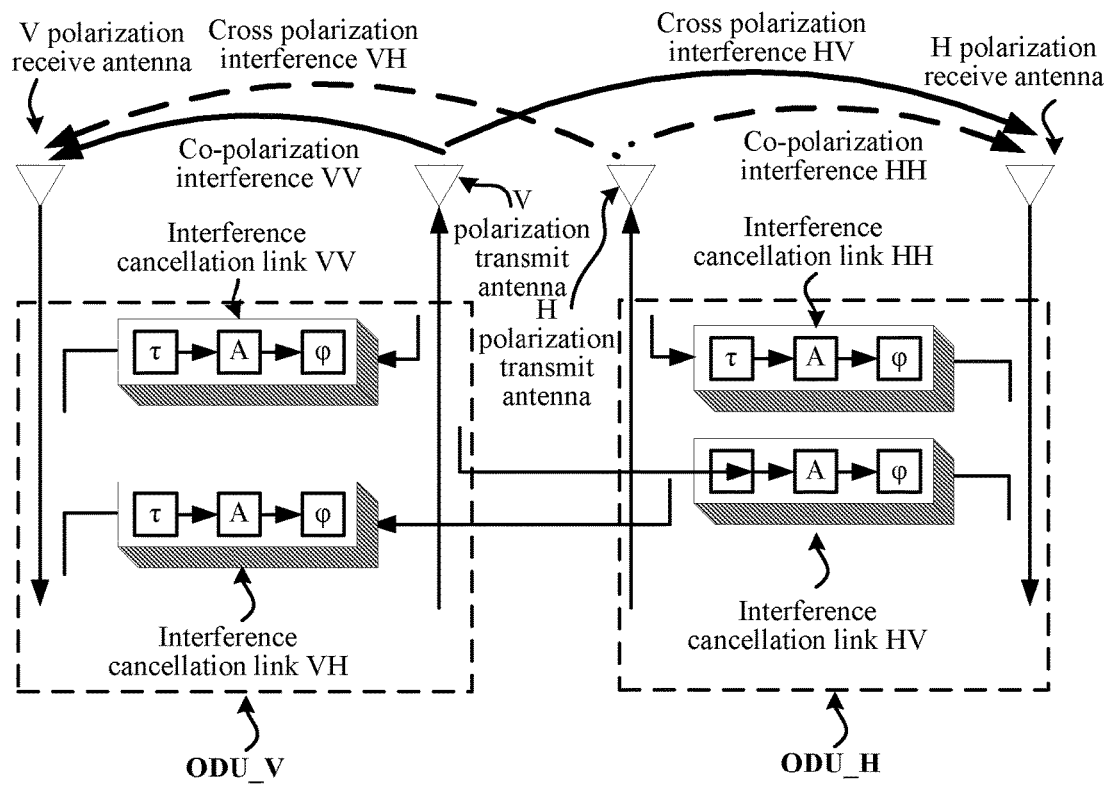
FIG. 1 -Prior Art-
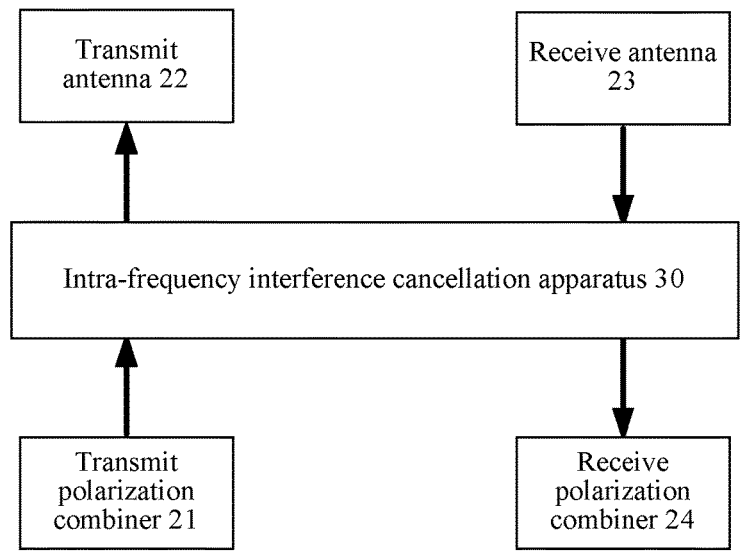
FIG. 2A

Acquire, by means of coupling, a first reference signal and a second reference signal from a transmit signal transmitted on a same transmit link at a local transmit end, where the transmit signal includes a V polarization signal and an H polarization signal —S111

Split each of the first reference signal and the second reference signal into N to 2N reference sub-signals, where a total quantity of the reference sub-signals is 3N to 4N —S112

Perform amplitude adjustment on at least N signals of the 3N to 4N reference sub-signals, and combine any two reference sub-signals into one interference cancellation signal, to obtain 2N interference cancellation signals including a reference sub-signal that is not combined —S113

Enable the N interference cancellation signals that meet the first preset proportion to separately pass through N simulated interference channels corresponding to the N interference paths, so that amplitudes and delays of the N interference cancellation signals are the same as amplitudes and delays of the N first interfering signals respectively, and differences between phases of the N interference cancellation signals and phases of the N first interfering signals are an odd number times 180° each, and enable the other N interference cancellation signals that meet the second preset proportion to separately pass through the N simulated interference channels corresponding to the N interference paths, so that amplitudes and delays of the other N interference cancellation signals are the same as amplitudes and delays of the N second interfering signals respectively, and differences between phases of the other N interference cancellation signals and phases of the N second interfering signals are an odd number times 180° each —S114

After the simulated interference channels are passed through, recombine the N interference cancellation signals that meet the first preset proportion into a first interference cancellation signal, and recombine the N interference cancellation signals that meet the second preset proportion into a second interference cancellation signal —S115

Output the first interference cancellation signal and the second interference cancellation signal to a same receive link at a local receive end by means of coupling, and combine the first interference cancellation signal and the second interference cancellation signal with a signal received by the local receive end —S116

FIG. 11

INTRA-FREQUENCY INTERFERENCE CANCELLATION METHOD, APPARATUS, AND SYSTEM

CROSS-REFERENCE TO RELATED APPLICATIONS

This application is a continuation of International Application No. PCT/CN2014/074864, filed on Apr. 4, 2014, the disclosure of which is hereby incorporated by reference in its entirety.

TECHNICAL FIELD

The present invention relates to the wireless and microwave communications field, and in particular, to an intra-frequency interference cancellation method, apparatus, and system.

BACKGROUND

Interference is a key technical problem that needs to be resolved by wireless and microwave communications devices. One of main interference of the wireless and microwave communications devices is caused by coupling of a local transmit antenna to a local receive antenna. In order to resolve interference brought by the coupling, an interference cancellation technology may be used: Acquiring a transmit signal from a local transmit end by means of coupling, so as to enable the transmit signal to pass through a simulated interference channel, adjusting a phase of the transmit signal so that a difference between the phase of the transmit signal and a phase of an interfering signal is an odd number times 180°, and then, performing coupling to connect the transmit signal to a local receive end, to cancel the interfering signal.

In an cross polarization interference cancellation (XPIC) system established by using outdoor unit (ODU), because polarization directions of ODUs are different, interference received by each ODU includes co-polarization interference brought by a transmit link of the ODU, and further includes cross polarization interference brought by a transmit link of another ODU. When an interference cancellation technology is used to cancel interference that exists in the XPIC system, each ODU needs at least two reference signals: One reference signal is from the ODU and used to cancel the co-polarization interference; and the other reference signal is from another ODU and used to cancel the cross polarization interference.

In a process of implementing the interference cancellation technology, the inventor finds that the prior art has at least the following problems: In an XPIC system established by using two ODUs having different polarization directions, each ODU needs at least two interference cancellation links; therefore, the established XPIC system is relatively complex.

SUMMARY

Embodiments of the present invention provide an intra-frequency interference cancellation method, apparatus, and system, which can simplify an XPIC system.

To achieve the foregoing objective, the following technical solutions are used in the embodiments of the present invention:

According to a first aspect, an intra-frequency interference cancellation method is provided, used to cancel interfering signals that are formed by a local transmit end and that interfere a local receive end, where the interfering signals include a first interfering signal received by a V polarization receive antenna and a second interfering signal received by an H polarization receive antenna, including:

performing coupling to acquire a first reference signal and a second reference signal from a transmit signal transmitted on a same transmit link at the transmit end, where the transmit signal includes a V polarization signal and an H polarization signal;

performing signal recombination according to the first reference signal and the second reference signal, to obtain a first interference cancellation signal and a second interference cancellation signal, where a proportion of V polarization signals to H polarization signals in the first interference cancellation signal meets a first preset proportion, and a proportion of V polarization signals to H polarization signals in the second interference cancellation signal meets a second preset proportion;

enabling the first interference cancellation signal to pass through a simulated interference channel, so that an amplitude and a delay of the first interference cancellation signal are the same as an amplitude and a delay of the first interfering signal respectively, and a difference between a phase of the first interference cancellation signal and a phase of the first interfering signal is an odd number times 180°, and enabling the second interference cancellation signal to pass through the simulated interference channel, so that an amplitude and a delay of the second interference cancellation signal are the same as an amplitude and a delay of the second interfering signal respectively, and a difference between a phase of the second interference cancellation signal and a phase of the second interfering signal is an odd number times 180°; and outputting, to a same receive link at the local receive end by means of coupling, the first interference cancellation signal and the second interference cancellation signal that have passed through the simulated interference channel, and combining the first interference cancellation signal and the second interference cancellation signal with a signal received by the local receive end.

With reference to the first aspect, in a first possible implementation manner of the first aspect, the first reference signal is irrelevant to the second reference signal.

With reference to the first aspect or the first possible implementation manner of the first aspect, in a second possible implementation manner of the first aspect, the performing signal recombination according to the first reference signal and the second reference signal, to obtain a first interference cancellation signal and a second interference cancellation signal includes:

splitting the first reference signal into a first reference sub-signal and a second reference sub-signal, and splitting the second reference signal into a third reference sub-signal and a fourth reference sub-signal;

performing amplitude adjustment on at least two signals of the first reference sub-signal, the second reference sub-signal, the third reference sub-signal, and the fourth reference sub-signal; and combining the first reference sub-signal and the third reference sub-signal into the first interference cancellation signal, and combining the second reference sub-signal and the fourth reference sub-signal into the second interference cancellation signal, where amplitude adjustment is performed on at least one of the signals in the first interference cancellation signal, and amplitude adjustment is performed on at least one of the signals in the second interference cancellation signal.

With reference to the first aspect or the first possible implementation manner of the first aspect, in a third possible implementation manner of the first aspect, the performing signal recombination according to the first reference signal and the second reference signal, to obtain a first interference cancellation signal and a second interference cancellation signal includes:

splitting the first reference signal into a first reference sub-signal and a second reference sub-signal;

performing amplitude adjustment on at least one signal of the first reference sub-signal and the second reference signal; and combining the first reference sub-signal and the second reference signal into the first interference cancellation signal, and using the second reference sub-signal as the second interference cancellation signal.

With reference to the second or the third possible implementation manner of the first aspect, in a fourth possible implementation manner of the first aspect, the interfering signals are multipath interfering signals, there are N interference paths, the multipath interfering signals include N first interfering signals received by the V polarization receive antenna and N second interfering signals received by the H polarization receive antenna, and the enabling the first interference cancellation signal to pass through a simulated interference channel, so that an amplitude and a delay of the first interference cancellation signal are the same as an amplitude and a delay of the first interfering signal respectively, and a difference between a phase of the first interference cancellation signal and a phase of the first interfering signal is an odd number times 180°, and enabling the second interference cancellation signal to pass through the simulated interference channel, so that an amplitude and a delay of the second interference cancellation signal are the same as an amplitude and a delay of the second interfering signal respectively, and a difference between a phase of the second interference cancellation signal and a phase of the second interfering signal is an odd number times 180° includes:

splitting each of the first interference cancellation signal and the second interference cancellation signal into N sub-signals; and enabling the N sub-signals that are obtained by splitting the first interference cancellation signal to separately pass through N simulated interference channels corresponding to the N interference paths, so that amplitudes and delays of the N sub-signals that are obtained by splitting the first interference cancellation signal are the same as amplitudes and delays of the N first interfering signals respectively, and differences between phases of the N sub-signals that are obtained by splitting the first interference cancellation signal and phases of the N first interfering signals are an odd number times 180° each, and enabling the N sub-signals that are obtained by splitting the second interference cancellation signal to separately pass through the N simulated interference channels corresponding to the N interference paths, so that amplitudes and delays of the N sub-signals that are obtained by splitting the second interference cancellation signal are the same as amplitudes and delays of the N second interfering signals respectively, and differences between phases of the N sub-signals that are obtained by splitting the second interference cancellation signal and phases of the N second interfering signals are an odd number times 180° each; and the method further includes: recombining, into two interference cancellation signals, the 2N sub-signals that have passed through the simulated interference channels.

With reference to the first aspect or any one of the first to the fourth possible implementation manners of the first aspect, in a fifth possible implementation manner of the first aspect, after the outputting, to a receive link at the local receive end by means of coupling, the first interference cancellation signal and the second interference cancellation signal that have passed through the simulated interference channel, the method further includes:

acquiring a feedback signal from the local receive end by means of coupling; and adjusting the first interference cancellation signal and the second interference cancellation signal according to the feedback signal.

According to a second aspect, an intra-frequency interference cancellation method is provided, used to cancel multipath interfering signals that are formed by a local transmit end and that interfere a local receive end, where there are N interference paths, the multipath interfering signals include N first interfering signals received by a V polarization receive antenna and N second interfering signals received by an H polarization receive antenna, including:

performing coupling to acquire a first reference signal and a second reference signal from a transmit signal transmitted on a same transmit link at the transmit end, where the transmit signal includes a V polarization signal and an H polarization signal;

splitting each of the first reference signal and the second reference signal into N to 2N reference sub-signals, where a total quantity of the reference sub-signals is 3N to 4N;

performing amplitude adjustment on at least N signals of the 3N to 4N reference sub-signals, and combining any two reference sub-signals into one interference cancellation signal, to obtain 2N interference cancellation signals including a reference sub-signal that is not combined, where the combined two reference sub-signals are reference signals that are from different paths and amplitude adjustment is performed on at least one reference sub-signal of the two reference sub-signals, a proportion of V polarization signals to H polarization signals in N interference cancellation signals meets a first preset proportion, and a proportion of V polarization signals to H polarization signals in the other N interference cancellation signals meets a second preset proportion;

enabling the N interference cancellation signals that meet the first preset proportion to separately pass through N simulated interference channels corresponding to the N interference paths, so that amplitudes and delays of the N interference cancellation signals are the same as amplitudes and delays of the N first interfering signals respectively, and differences between phases of the N interference cancellation signals and phases of the N first interfering signals are an odd number times 180° each, and enabling the other N interference cancellation signals that meet the second preset proportion to separately pass through the N simulated interference channels corresponding to the N interference paths, so that amplitudes and delays of the other N interference cancellation signals are the same as amplitudes and delays of the N second interfering signals respectively, and differences between phases of the other N interference cancellation signals and phases of the N second interfering signals are an odd number times 180° each;

after the simulated interference channels are passed through, recombining the N interference cancellation signals that meet the first preset proportion into a first interference cancellation signal, and recombining the N interference cancellation signals that meet the second preset proportion into a second interference cancellation signal; and outputting the first interference cancellation signal and the second interference cancellation signal to a same receive link at the local receive end by means of coupling, and combining the first interference cancellation signal and the second interference cancellation signal with a signal received by the local receive end.

With reference to the second aspect, in a first possible implementation manner of the second aspect, the first reference signal is irrelevant to the second reference signal.

With reference to the second aspect or the first possible implementation manner of the second aspect, in a second possible implementation manner of the second aspect, after the outputting the first interference cancellation signal and the second interference cancellation signal to a receive link at the local receive end by means of coupling, the method further includes:

acquiring a feedback signal from the local receive end by means of coupling; and adjusting the first interference cancellation signal and the second interference cancellation signal according to the feedback signal.

According to a third aspect, an intra-frequency interference cancellation apparatus is provided, configured to cancel interfering signals that are formed by a local transmit end and that interfere a local receive end, where the interfering signals include a first interfering signal received by a V polarization receive antenna and a second interfering signal received by an H polarization receive antenna, including:

a first coupler, configured to perform coupling to acquire a first reference signal and a second reference signal from a transmit signal transmitted on a same transmit link at the local transmit end, where the transmit signal includes a V polarization signal and an H polarization signal;

a signal recombiner, configured to perform signal recombination according to the first reference signal and the second reference signal that are acquired by the first coupler by means of coupling, to obtain a first interference cancellation signal and a second interference cancellation signal, where a proportion of V polarization signals to H polarization signals in the first interference cancellation signal meets a first preset proportion, and a proportion of V polarization signals to H polarization signals in the second interference cancellation signal meets a second preset proportion;

a channel simulator, configured to adjust the first interference cancellation signal and the second interference cancellation signal that are obtained by the signal recombiner, so that an amplitude and a delay of the first interference cancellation signal are the same as an amplitude and a delay of the first interfering signal respectively, and a difference between a phase of the first interference cancellation signal and a phase of the first interfering signal is an odd number times 180°, and an amplitude and a delay of the second interference cancellation signal are the same as an amplitude and a delay of the second interfering signal respectively, and a difference between a phase of the second interference cancellation signal and a phase of the second interfering signal is an odd number times 180°; and a second coupler, configured to output, to a same receive link at the local receive end by means of coupling, the first interference cancellation signal and the second interference cancellation signal that are adjusted by the channel simulator, and combine the first interference cancellation signal and the second interference cancellation signal with a signal received by the local receive end.

With reference to the third aspect, in a first possible implementation manner of the third aspect, the first reference signal is irrelevant to the second reference signal.

With reference to the third aspect or the first possible implementation manner of the third aspect, in a second possible implementation manner of the third aspect, the signal recombiner includes:

a first signal splitter, configured to split the first reference signal into a first reference sub-signal and a second reference sub-signal;

a second signal splitter, configured to split the second reference signal into a third reference sub-signal and a fourth reference sub-signal;

at least two attenuators or amplifiers, configured to perform amplitude adjustment on at least two signals of the first reference sub-signal, the second reference sub-signal, the third reference sub-signal, and the fourth reference sub-signal;

a first power combiner, configured to combine the first reference sub-signal and the third reference sub-signal into the first interference cancellation signal, where amplitude adjustment is performed by the attenuator or the amplifier on at least one of the signals in the first interference cancellation signal; and a second power combiner, configured to combine the second reference sub-signal and the fourth reference sub-signal into the second interference cancellation signal, where amplitude adjustment is performed by the attenuator or the amplifier on at least one of the signals in the second interference cancellation signal.

With reference to the third aspect or the first possible implementation manner of the third aspect, in a third possible implementation manner of the third aspect, the signal recombiner includes:

a first signal splitter, configured to split the first reference signal into a first reference sub-signal and a second reference sub-signal;

at least one attenuator or amplifier, configured to perform amplitude adjustment on at least one signal of the first reference sub-signal and the second reference signal;

a first power combiner, configured to combine the first reference sub-signal and the second reference signal into the first interference cancellation signal, where the second reference sub-signal is used as the second interference cancellation signal.

With reference to the second or the third possible implementation of the third aspect, in a fourth possible implementation manner of the third aspect, the interfering signals are multipath interfering signals, there are N interference paths, the multipath interfering signals include N first interfering signals received by the V polarization receive antenna and N second interfering signals received by the H polarization receive antenna, and the apparatus further includes:

a third signal splitter, configured to split the first interference cancellation signal into N sub-signals;

a fourth signal splitter, configured to split the second interference cancellation signal into N sub-signals, where the channel simulator includes 2N subunits, where N subunits are separately configured to adjust the N sub-signals that are obtained by splitting by the third signal splitter, so that amplitudes and delays of the N sub-signals that are obtained by splitting by the third signal splitter are the same as amplitudes and delays of the N first interfering signals respectively, and differences between phases of the N sub-signals that are obtained by splitting by the third signal splitter and phases of the N first interfering signals are an odd number times 180° each, and the other N subunits are separately configured to adjust the N sub-signals that are obtained by splitting by the fourth signal splitter, so that amplitudes and delays of the N sub-signals that are obtained by splitting by the fourth signal splitter are the same as amplitudes and delays of the N second interfering signals respectively, and differences between phases of the N sub-signals that are obtained by splitting by the fourth signal splitter and phases of the N second interfering signals are an odd number times 180° each; and two power recombiners, configured to recombine, into two interference cancellation signals, the 2N sub-signals that are adjusted by the channel simulator.

With reference to the third aspect or any one of the first to the fourth possible implementation manners of the third aspect, in a fifth possible implementation manner of the third aspect, the apparatus further includes: a feedback circuit, configured to perform coupling to acquire a feedback signal from the local receive end, and adjust the first interference cancellation signal and the second interference cancellation signal according to the feedback signal.

With reference to the third aspect or any one of the first to the fifth possible implementation manners of the third aspect, in a sixth possible implementation manner of the third aspect, the first coupler and the second coupler are both two-port couplers, where an included angle θ between two coupling output ports of the first coupler meets 0°<|θ|<180°, and an included angle γ between two coupling output ports of the second coupler meets 0°<|γ|<180°.

According to a fourth aspect, an intra-frequency interference cancellation apparatus is provided, configured to cancel multipath interfering signals that are formed by a local transmit end and that interfere a local receive end, where there are N interference paths, and the multipath interfering signals include N first interfering signals received by a V polarization receive antenna and N second interfering signals received by an H polarization receive antenna, including:

a first coupler, configured to perform coupling to acquire a first reference signal and a second reference signal from a transmit signal transmitted on a same transmit link at the transmit end, where the transmit signal includes a V polarization signal and an H polarization signal;

two signal splitters, configured to split each of the first reference signal and the second reference signal into N to 2N reference sub-signals, where a total quantity of the reference sub-signals is 3N to 4N;

at least N attenuators or amplifiers, configured to perform amplitude adjustment on at least N signals of the 3N to 4N reference sub-signals;

at least N power combiners, configured to combine any two reference sub-signals into one interference cancellation signal, to obtain 2N interference cancellation signals including a reference sub-signal that is not combined, where the combined two reference sub-signals are reference signals that are from different paths and amplitude adjustment is performed on at least one reference sub-signal of the two reference sub-signals, a proportion of V polarization signals to H polarization signals in N interference cancellation signals meets a first preset proportion, and a proportion of V polarization signals to H polarization signals in the other N interference cancellation signals meets a second preset proportion;

a channel simulator including 2N subunits, where N subunits are configured to adjust the N interference cancellation signals that meet the first preset proportion, so that amplitudes and delays of the N interference cancellation signals are the same as amplitudes and delays of the N first interfering signals respectively, and differences between phases of the N interference cancellation signals and phases of the N first interfering signals are an odd number times 180° each, and the other N subunits are configured to adjust the N interference cancellation signals that meet the second preset proportion, so that amplitudes and delays of the N interference cancellation signals are the same as amplitudes and delays of the N second interfering signals respectively, and differences between phases of the N interference cancellation signals and phases of the N second interfering signals are an odd number times 180° each;

a first power recombiner, configured to recombine the N interference cancellation signals that meet the first preset proportion into a first interference cancellation signal;

a second power recombiner, configured to recombine the N interference cancellation signals that meet the second preset proportion into a second interference cancellation signal; and a second coupler, configured to output the first interference cancellation signal and the second interference cancellation signal to a same receive link at the local receive end by means of coupling, and combine the first interference cancellation signal and the second interference cancellation signal with a signal received by the local receive end.

With reference to the fourth aspect, in a first possible implementation manner of the fourth aspect, the first reference signal is irrelevant to the second reference signal.

With reference to the fourth aspect or the first possible implementation manner of the fourth aspect, in a second possible implementation manner of the fourth aspect, the apparatus further includes: a feedback circuit, configured to perform coupling to acquire a feedback signal from the local receive end, and adjust the first interference cancellation signal and the second interference cancellation signal according to the feedback signal.

With reference to the fourth aspect or either one of the first and the second possible implementation manners of the fourth aspect, in a third possible implementation manner of the fourth aspect, the first coupler and the second coupler are both two-port couplers, where an included angle θ between two coupling output ports of the first coupler meets 0°<|θ|<180°, and an included angle γ between two coupling output ports of the second coupler meets 0°<|γ|<180°.

According to a fifth aspect, an intra-frequency interference cancellation system is provided, including: a transmit polarization combiner that combines a V polarization signal and an H polarization signal into a transmit signal; a local dual polarization transmit antenna that transmits the transmit signal obtained by combination by the transmit polarization combiner; a local dual polarization receive antenna that is interfered by the transmit signal of the local dual polarization transmit antenna; and a receive polarization combiner that splits a received signal received by the local dual polarization receive antenna into a V polarization signal and an H polarization signal; and further including: the intra-frequency interference cancellation apparatus according to any one of claims 10 to 16, where a first coupler of the intra-frequency interference cancellation apparatus is connected to a same transmit link between the transmit polarization combiner and the local dual polarization transmit antenna, and a second coupler of the intra-frequency interference cancellation apparatus is connected to a same receive link between the receive polarization combiner and the local dual polarization receive antenna.

With reference to the fifth aspect, in a first possible implementation manner of the fifth aspect, the transmit polarization combiner is connected to the local dual polarization transmit antenna by using any transmission line that can transmit a V polarization signal and an H polarization signal simultaneously; and the receive polarization combiner is connected to the local dual polarization receive antenna by using any transmission line that can transmit a V polarization signal and an H polarization signal simultaneously.

With reference to the first possible implementation manner of the fifth aspect, in a second possible implementation manner of the fifth aspect, the transmission line includes a circular waveguide.

According to a sixth aspect, an intra-frequency interference cancellation system is provided, including: a transmit polarization combiner that combines a V polarization signal and an H polarization signal into a transmit signal; a local dual polarization transmit antenna that transmits the transmit signal obtained by combination by the transmit polarization combiner; a local dual polarization receive antenna that is interfered by the transmit signal of the local dual polarization transmit antenna; and a receive polarization combiner that splits a received signal received by the local dual polarization receive antenna into a V polarization signal and an H polarization signal; and further including: the intra-frequency interference cancellation apparatus according to any one of claims 17 to 20, where a first coupler of the intra-frequency interference cancellation apparatus is connected to a same transmit link between the transmit polarization combiner and the local dual polarization transmit antenna, and a second coupler of the intra-frequency interference cancellation apparatus is connected to a same receive link between the receive polarization combiner and the local dual polarization receive antenna.

With reference to the sixth aspect, in a first possible implementation manner of the sixth aspect, the transmit polarization combiner is connected to the local dual polarization transmit antenna by using any transmission line that can transmit a V polarization signal and an H polarization signal simultaneously; and the receive polarization combiner is connected to the local dual polarization receive antenna by using any transmission line that can transmit a V polarization signal and an H polarization signal simultaneously.

With reference to the first possible implementation manner of the sixth aspect, in a second possible implementation manner of the sixth aspect, the transmission line includes a circular waveguide.

According to the intra-frequency interference cancellation method, apparatus, and system that are provided by the embodiments of the present invention, by means of signal recombination, a proportion of V polarization signals to H polarization signals in a first interference cancellation signal can be adjusted randomly, so that the proportion meets a first preset proportion required for canceling a first interfering signal received by a local dual polarization receive antenna; and a proportion of V polarization signals to H polarization signals in a second interference cancellation signal can be adjusted randomly, so that the proportion meets a second preset proportion required for canceling a second interfering signal received by the local dual polarization receive antenna; therefore, only two interference cancellation links corresponding to two interference cancellation signals are required to cancel the interfering signals, and compared with the prior art that four interference cancellation links are required, the present invention surely simplifies an XPIC system.

BRIEF DESCRIPTION OF DRAWINGS

FIG. 1 is a schematic diagram of an existing XPIC system;

FIG. 2A is a schematic diagram of an intra-frequency interference cancellation system according to Embodiment 1 of the present invention;

FIG. 11 is a flowchart of an intra-frequency interference cancellation method according to Embodiment 10 of the present invention.

DESCRIPTION OF EMBODIMENTS

Figure 2B:
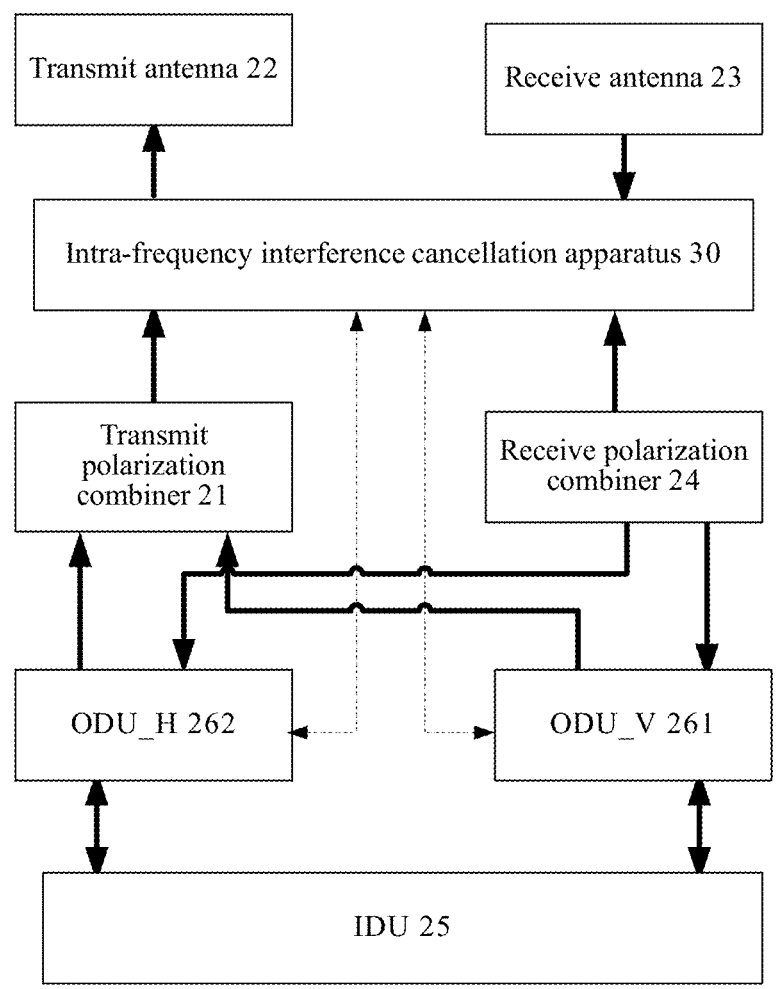
FIG. 2B is a schematic diagram of an intra-frequency interference cancellation system according to Embodiment 2 of the present invention.

In a wireless and microwave communications system, in order to resolve interference brought by coupling from a local transmit antenna to a local receive antenna, different technologies may be selected and used according to an actual situation. In an FDD (Frequency Division Duplex, frequency division duplex) system, because a transmit carrier and a receive carrier use different frequencies, a duplexer may be selected and used to suppress interference from local transmitting to local receiving. In a TDD (Time Division Duplex, time division duplex) system, because a transmit carrier and a receive carrier have a same frequency, transmitting and receiving may be performed in turn by defining different sending and receiving timeslots, so as to avoid interference from transmission at a local end to receiving at a local end. If a transmit carrier frequency is set to be the same as a receive carrier frequency, and transmitting and receiving are performed simultaneously, an interference suppression technology that is applicable to the foregoing FDD system and TDD system is no longer applicable.

In a case in which a transmit carrier frequency is the same as a receive carrier frequency, and transmitting and receiving are performed simultaneously, an interference cancellation technology may be used. Specifically, a coupler may be used to perform coupling to acquire a transmit signal at a local transmit end, a signal acquired by means of coupling is enabled to pass through a simulated interference channel formed by an attenuator, an amplifier (or a variable gain amplifier), a phase shifter, a delay line, and the like, and after a phase of the signal is adjusted so that a difference between the phase of the signal and a phase of an interfering signal is an odd number times 180° (including 180°), the signal is output to a local receive end by means of coupling, so as to cancel the interfering signal. In an FDD system, dependence on performance of a duplexer can be reduced by using the interference cancellation technology, and even the duplexer may be not used; and in a TDD system, transmitting and receiving can also be performed simultaneously without defining sending and receiving timeslots.

In a microwave and wireless communications system implemented based on the interference cancellation technology, an interference cancellation signal is from the interior of the system; or a transmit link is coupled and an interference channel is simulated, or an independent interference cancellation signal generation link may be established by using hardware.

An interfering signal in an XPIC system is described with reference to FIG. 1 below.

As shown in FIG. 1, the XPIC system includes an ODU_V in a V polarization direction, a V polarization transmit antenna and a V polarization receive antenna that are connected to the ODU_V, an ODU_H in an H polarization direction, and an H polarization transmit antenna and an H polarization receive antenna that are connected to the ODU_H. When transmit frequencies of the two ODUs are the same as receive frequencies of the two ODUs, and transmitting and receiving are performed simultaneously, interference received by the V polarization receive antenna includes: co-polarization interference VV generated by the V polarization transmit antenna to the V polarization receive antenna, and cross polarization interference VH generated by the H polarization transmit antenna to the V polarization receive antenna. Similarly, interference received by the H polarization receive antenna includes: co-polarization interference HH generated by the H polarization transmit antenna to the H polarization receive antenna, and cross polarization interference HV generated by the V polarization transmit antenna to the H polarization receive antenna.

In order to cancel the co-polarization interference VV and HH, the two ODUs each need to perform coupling to form a co-polarization interference cancellation signal internally. In order to cancel the cross polarization interference VH and HV, the two ODUs each need to perform coupling to form a cross polarization interference cancellation signal from a transmit signal of the other ODU. Therefore, each ODU needs at least two interference cancellation links (in a case in which multipath interference exists, more interference cancellation links are required), and a formed XPIC system is relatively complex; in addition, bidirectional signal transmission exists between the two ODUs; therefore, the two ODUs are coupled.

In the XPIC system, a V polarization signal and an H polarization signal may be combined into a dual polarization transmit signal by an orthogonal mode transducer (Orthogonal Mode Transducer, OMT); and a dual polarization receive signal may also be split into a V polarization signal and an H polarization signal by the orthogonal mode transducer. Therefore, the two ODUs may share a same dual polarization transmit antenna and a same dual polarization receive antenna. Even in this case, a quantity of interference cancellation links is not reduced accordingly, and at least four interference cancellation links are still required.

In the XPIC system, interference channels from a dual polarization transmit antenna to dual polarization receive antennas in two polarization directions are generally considered to be the same or have a small difference, that is, it may be considered that, changes of parameters such as amplitudes, delays, or phases of a signal are the same after the signal passes through the interference channels in the two polarization directions. Assume that an interference channel model is $H(A_0, \tau_0, \phi_0)$, where $A_0$, $\tau_0$, and $\phi_0$ respectively indicate variations of an amplitude, a delay, and a phase of an interfering signal after the interfering signal passes through an interference channel. It should be noted that, in a case in which the V polarization transmit antenna and the H polarization transmit antenna are separately disposed and a distance is short, and the V polarization receive antenna and the H polarization receive antenna are separately disposed and a distance is short, it may also be considered that changes of parameters such as amplitudes, delays, or phases of a signal are the same after the signal passes through the interference channels in the two polarization directions. Unless otherwise stated, a description is provided below under a precondition that changes of parameters such as amplitudes, delays, or phases of a signal are the same after the signal passes through the interference channels in the two polarization directions.

However, because of a difference of an antenna gain in a different polarization direction and impact of XPD (Cross Polarization Discrimination, cross polarization discrimination) of an antenna system, an antenna receives different signals in the V polarization direction and the H polarization direction. If intra-frequency interference generated by the H polarization transmit antenna to the H polarization receive antenna is used as a reference, and it is assumed that an interfering signal after an H polarization transmit signal $S_H^T$ passes through the H polarization transmit antenna, an interference channel, and the H polarization receive antenna is $H(A_0, \tau_0, \phi_0) \cdot S_H^T$, other three interfering signals may be expressed as follows:

An interfering signal after the H polarization signal $S_H^T$ passes through the H polarization transmit antenna, an interference channel, and the V polarization receive antenna is: $\Delta G \cdot \Delta X_{VH} \cdot (H(A_0, \tau_0, \phi_0) \cdot S_H^T)$, where $\Delta G$ indicates a ratio of a gain of the antenna in the V polarization direction to a gain of the antenna in the H polarization direction in an interference transmit or receive direction, and $\Delta X_{VH}$ indicates XPD from H polarization to V polarization of the XPIC system.

An interfering signal after a V polarization signal $S_V^T$ passes through the V polarization transmit antenna, an interference channel, and the V polarization receive antenna is: $\Delta G^2 \cdot (H(A_0, \tau_0, \phi_0) \cdot S_V^T)$.

An interfering signal after the V polarization signal $S_V^T$ passes through the V polarization transmit antenna, an interference channel, and the H polarization receive antenna is: $\Delta G \cdot \Delta X_{HV} \cdot (H(A_0, \tau_0, \phi_0) \cdot S_V^T)$, where $\Delta X_{HV}$ indicates XPD from V polarization to H polarization of the XPIC system.

To sum up, an interfering signal $I_V$ received by the V polarization receive antenna, that is, a subsequent first interfering signal is:

$$I_V = \Delta G \cdot \Delta X_{VH} \cdot (H(A_0,\tau_0,\phi_0) \cdot S_H^T) + \Delta G^2 \cdot (H(A_0,\tau_0,\phi_0) \cdot S_V^T); \text{ and}$$

an interfering signal $I_H$ received by the H polarization receive antenna, that is, a subsequent second interfering signal is:

$$I_H = H(A_0,\tau_0,\phi_0) \cdot S_H^T + \Delta G \cdot \Delta X_{HV} \cdot (H(A_0,\tau_0,\phi_0) \cdot S_V^T).$$

As can be seen from the above, interfering signals received by the receive antenna in different polarization directions all include signals in the two polarization directions, but weights of polarization signals are generally different, that is, a proportion of V polarization signals to H polarization signals in first interfering signal $I_V$ is different from a proportion of V polarization signals to H polarization signals in the second interfering signal. In addition, two interfering signals are generally irrelevant. An expression of $I_V$ and $I_H$ may be combined into a matrix form:

$$\begin{bmatrix} I_V \\ I_H \end{bmatrix} = \begin{bmatrix} H(A_0, \tau_0, \phi_0) & 0 \\ 0 & H(A_0, \tau_0, \phi_0) \end{bmatrix} \cdot \begin{bmatrix} \Delta G^2 & \Delta G \cdot \Delta X_{VH} \\ \Delta G \cdot \Delta X_{HV} & 1 \end{bmatrix} \cdot \begin{bmatrix} S_V^T \\ S_H^T \end{bmatrix}. \quad (1)$$

According to an intra-frequency interference cancellation method, apparatus, and system that are provided by embodiments of the present invention, the interfering signals shown in the formula (1) can be canceled. The following clearly describes the technical solutions in the embodiments of the present invention with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

FIG. 2A is a schematic diagram of an intra-frequency interference cancellation system according to Embodiment 1 of the present invention. As shown in FIG. 2A, the system includes: a transmit polarization combiner 21, configured to combine a V polarization signal and an H polarization signal into a transmit signal; a local dual polarization transmit antenna 22 (which may be referred to as a transmit antenna 22 for short), configured to transmit the transmit signal obtained by combination by the transmit polarization combiner 21; a local dual polarization receive antenna 23 (which may be referred to as a receive antenna 23 for short) interfered by the transmit signal of the transmit antenna 22; a receive polarization combiner 24, configured to split a received signal of the receive antenna 23 into a V polarization signal and an H polarization signal; and an intra-frequency interference cancellation apparatus 30.

A reference signal input end of the intra-frequency interference cancellation apparatus 30, that is, a first coupler (referring to the following embodiment) is connected to a same transmit link between the transmit polarization combiner 21 and the transmit antenna 22, and an interference cancellation signal output end of the intra-frequency interference cancellation apparatus 30, that is, a second coupler (referring to the following embodiment) is connected to a same receive link between the receive polarization combiner 24 and the receive antenna 23. The same transmit link or the same receive link refers to that a transmit signal including a V polarization signal and an H polarization signal is transmitted on a same transmission link.

The intra-frequency interference cancellation apparatus 30 is specifically configured to: perform coupling to acquire two reference signals from a transmit signal between the transmit polarization combiner 21 and the transmit antenna 22 by using the reference signal input end, that is, a first reference signal and a second reference signal; perform signal recombination according to the two reference signals, to obtain a first interference cancellation signal and a second interference cancellation signal, where a proportion of V polarization signals to H polarization signals in the first interference cancellation signal meets a first preset proportion, and a proportion of V polarization signals to H polarization signals in the second interference cancellation signal meets a second preset proportion; adjust the first interference cancellation signal and the second interference cancellation signal, so that an amplitude and a delay of the first interference cancellation signal are the same as an amplitude and a delay of the first interfering signal respectively, and a difference between a phase of the first interference cancellation signal and a phase of the first interfering signal is an odd number times 180°, and an amplitude and a delay of the second interference cancellation signal are the same as an amplitude and a delay of the second interfering signal respectively, and a difference between a phase of the second interference cancellation signal and a phase of the second interfering signal is an odd number times 180% and output, to a place between the receive polarization combiner 24 and the dual polarization receive antenna 23, the two interference cancellation signals by means of coupling by using the interference cancellation signal output end, and combine the two interference cancellation signals with a signal received by the receive antenna 23. A working principle of the intra-frequency interference cancellation apparatus 30 is specifically described in the following embodiment.

Optionally, the transmit polarization combiner 21 is connected to the transmit antenna 22 by using any transmission line that can transmit a V polarization signal and an H polarization signal simultaneously; and the receive polarization combiner 24 is connected to the receive antenna 23 by using any transmission line that can transmit a V polarization signal and an H polarization signal simultaneously. Preferably, the transmission line is a circular waveguide. In the following descriptions, an example in which the transmission line is a circular waveguide is used for description, and it may be understood that, the transmission line may also be another transmission line in addition to a circular waveguide.

According to the intra-frequency interference cancellation system that is provided by Embodiment 1 of the present invention, by means of signal recombination, a proportion of V polarization signals to H polarization signals in a first interference cancellation signal can be adjusted randomly, so that the proportion meets a first preset proportion required for canceling a first interfering signal received by a local dual polarization receive antenna; and a proportion of V polarization signals to H polarization signals in a second interference cancellation signal can be adjusted randomly, so that the proportion meets a second preset proportion required for canceling a second interfering signal received by the local dual polarization receive antenna. Therefore, only two interference cancellation links corresponding to two interference cancellation signals are required to cancel the interfering signals, and compared with the prior art in which four interference cancellation links are required, the present invention surely simplifies an XPIC system, and can improve transmit/receive isolation.

Embodiment 2

FIG. 2B is a schematic diagram of an intra-frequency interference cancellation system according to Embodiment 2 of the present invention. As shown in FIG. 2B, based on Embodiment 1, the system further includes: an indoor unit IDU 25 and an outdoor unit ODU, where the IDU 25 is separately connected to an ODU_V 261 in a V polarization direction and an ODU_H 262 in an H polarization direction.

At a local transmit end, the transmit polarization combiner 21 is separately connected to the ODU_V 261 and the ODU_H 262. A V polarization signal is generated from the IDU 25, passes through the ODU_V 261, and is input to the transmit polarization combiner 21; and an H polarization signal is generated from the IDU 25, passes through the ODU_H 262, and is input to the transmit polarization combiner 21. The V polarization signal and the H polarization signal are combined into one transmit signal at the transmit polarization combiner 21, where the transmit signal is a dual polarization transmit signal, and then, is transmitted by a circular waveguide to the transmit antenna 22 for transmitting. A first coupler 31 (referring to FIG. 3, used as the reference signal input end of the apparatus 30) may be disposed between the transmit polarization combiner 21 and the transmit antenna 22, to acquire two reference signals by means of coupling. After the apparatus 30 performs a series of processing on the two reference signals acquired by the first coupler 31 by means of coupling, two interference cancellation signals are obtained.

At a local receive end, the receive polarization combiner 24 is separately connected to the ODU_V 261 and the ODU_H 262. The receive antenna 23 receives a signal, where the received signal includes an interfering signal, and the interfering signal is from the transmit signal, transmitted through an interference channel, of the transmit antenna 22. The received signal also includes a received signal in the V polarization direction and a received signal in the H polarization direction. In a process in which the received signal is transmitted to the receive polarization combiner 24, the received signal is combined with two interference cancellation signals input by means of coupling by a second coupler 34 (referring to FIG. 3) disposed between the receive antenna 23 and the receive polarization combiner 24, so as to cancel the interfering signal in the received signal, that is, the interfering signal shown in the formula (1). The received signal in which the interfering signal is canceled is split into a V polarization signal and an H polarization signal at the receive polarization combiner 24, and then, the V polarization signal and the H polarization signal are respectively input to the ODU_V 261 and the ODU_H 262, and are received by the IDU 25 finally.

It should be noted that, the V polarization signal and the H polarization signal that are included in the transmit signal transmitted by the transmit antenna 22 are interfering signals for the receive antenna 23. The received signal of the receive antenna 23 not only includes interference transmitted by the transmit antenna 22, but also includes a wanted signal sent by a peer-end device.

The IDU 25 and the ODU may also be full outdoor unit (Full Outdoor, FO) apparatuses.

According to the intra-frequency interference cancellation system that is provided by Embodiment 2 of the present invention, by means of signal recombination, a proportion of V polarization signals to H polarization signals in a first interference cancellation signal can be adjusted randomly, so that the proportion meets a first preset proportion required for canceling a first interfering signal received by a local dual polarization receive antenna; and a proportion of V polarization signals to H polarization signals in a second interference cancellation signal can be adjusted randomly, so that the proportion meets a second preset proportion required for canceling a second interfering signal received by the local dual polarization receive antenna; therefore, only two interference cancellation links corresponding to two interference cancellation signals are required to cancel the interfering signals, and compared with the prior art in which four interference cancellation links are required, the present invention surely simplifies an XPIC system, and can improve transmit/receive isolation.

The intra-frequency interference cancellation apparatuses in Embodiment 1 and Embodiment 2 are described in Embodiment 3 to Embodiment 8 below.

Embodiment 3

Figure 3:
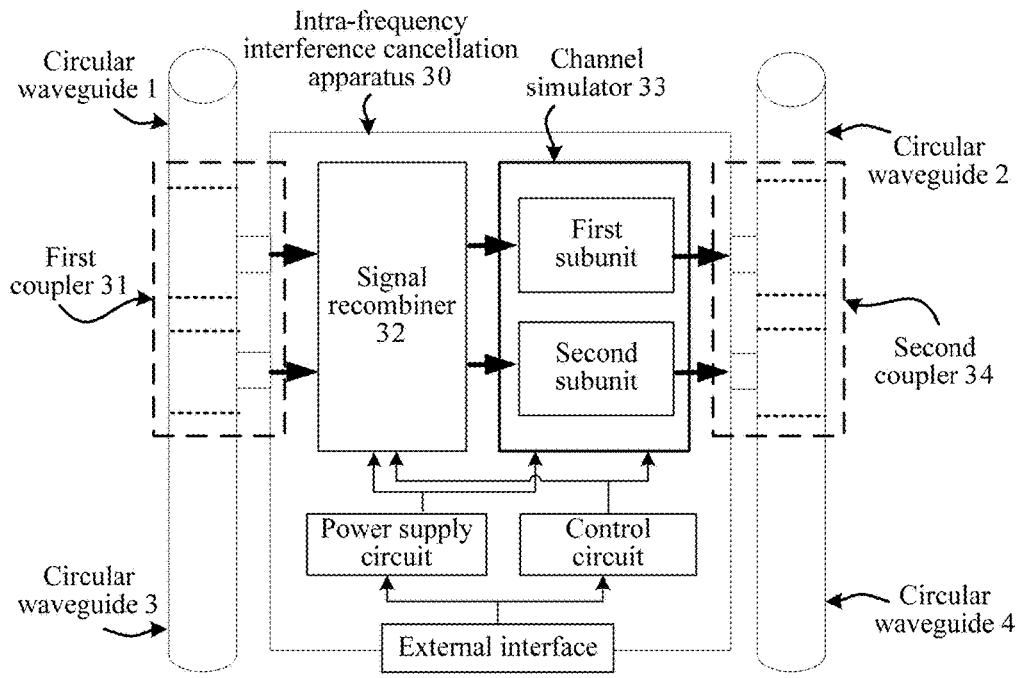
FIG. 3 is a schematic structural diagram of an intra-frequency interference cancellation apparatus according to Embodiment 3 of the present invention.

FIG. 3 is a schematic structural diagram of an intra-frequency interference cancellation apparatus according to Embodiment 3 of the present invention. As shown in FIG. 3, the intra-frequency interference cancellation apparatus 30 is configured to cancel interfering signals that are formed by a local transmit end and that interfere a local receive end. As described above, the interfering signals include a first interfering signal received by a V polarization receive antenna and a second interfering signal received by an H polarization receive antenna. The apparatus 30 includes:

a first coupler 31, configured to perform coupling to acquire a first reference signal and a second reference signal from a transmit signal transmitted on a same transmit link at the local transmit end, where the transmit signal includes a V polarization signal and an H polarization signal;

a signal recombiner 32, configured to perform signal recombination according to the first reference signal and the second reference signal that are acquired by the first coupler by means of coupling 31, to obtain a first interference cancellation signal and a second interference cancellation signal, where a proportion of V polarization signals to H polarization signals in the first interference cancellation signal meet a first preset proportion, and a proportion of V polarization signals to H polarization signals in the second interference cancellation signal meet a second preset proportion;

a channel simulator 33, configured to adjust the first interference cancellation signal and the second interference cancellation signal that are obtained by the signal recombiner 32, so that an amplitude and a delay of the first interference cancellation signal are the same as an amplitude and a delay of the first interfering signal respectively, and a difference between a phase of the first interference cancellation signal and a phase of the first interfering signal is an odd number times 180°, and an amplitude and a delay of the second interference cancellation signal are the same as an amplitude and a delay of the second interfering signal respectively, and a difference between a phase of the second interference cancellation signal and a phase of the second interfering signal is an odd number times 180°; and a second coupler 34, configured to output, to a same receive link at the local receive end by means of coupling, the first interference cancellation signal and the second interference cancellation signal that are adjusted by the channel simulator 33, and combine the first interference cancellation signal and the second interference cancellation signal with a signal received by the local receive end.

A working principle of the intra-frequency interference cancellation apparatus 30 is specifically described below.

First, the first coupler 31 and the second coupler 34 are described.

The first coupler 31 is preferably a two-port coupler, that is, the coupler has two coupling output ports. The first coupler 31 acquires two reference signals $S_1^{R1}$ and $S_1^{R2}$ from a transmit signal of the transmit end by means of coupling, and the two reference signals meet:

$$\begin{cases} S_1^{R1} = a_1 S_V^T + b_1 S_H^T \\ S_1^{R2} = c_1 S_V^T + d_1 S_H^T \end{cases}; \text{and}$$

when written in a matrix form, the two reference signals are:

$$\begin{bmatrix} S_1^{R1} \\ S_1^{R2} \end{bmatrix} = \begin{bmatrix} a_1 & b_1 \\ c_1 & d_1 \end{bmatrix} \cdot \begin{bmatrix} S_V^T \\ S_H^T \end{bmatrix}, \text{where} \quad (2)$$

assume that $S_V^T$ and $S_H^T$ are respectively a V polarization signal and an H polarization signal that are fed into a circular waveguide 3, $a_1$ and $b_1$ respectively indicate a coupling factor for the V polarization signal that is determined by a position of a first coupling port of the first coupler 31 and a coupling factor for the H polarization signal that is determined by the position of the first coupling port of the first coupler 31; and $c_1$ and $d_1$ respectively indicate a coupling factor for the V polarization signal that is determined by a position of a second coupling port of the first coupler 31 and a coupling factor for the H polarization signal that is determined by the position of the second coupling port of the first coupler 31.

As can be seen from the formula (1), each interfering signal received by the receive antenna 23 in a V polarization direction and an H polarization direction includes signals in the two polarization directions. For two interfering signals that include the signals in the two polarization directions and that are irrelevant, only two irrelevant cancellation reference signals can cancel both the two interfering signals. Therefore, a coupling factor of the first coupler 31 needs to meet the following constraint relationship:

$$\text{rank}\left(\begin{bmatrix} a_1 & b_1 \\ c_1 & d_1 \end{bmatrix}\right) \equiv 2. \quad (3)$$

That is, a quantity of linearly independent rows in the matrix/a quantity of linearly independent columns in the matrix is required to be two.

Similarly, a two-port coupler is preferably used as the second coupler 34. Because the two-port coupler is a passive device, and ports meet a reciprocal relationship, the second coupler 34 may be analyzed according to a method for analyzing the first coupler 31. When two signals $S_V^R$ and $S_H^R$ whose polarization directions are orthogonal are separately transmitted from a circular waveguide 4 to a circular waveguide 2 (actually, the signals are transmitted from the circular waveguide 2 to the circular waveguide 4), it is assumed that reference signals $S_2^{R1}$ and $S_2^{R2}$ that are output from two coupling ports of the second coupler 34 are respectively:

$$\begin{cases} S_2^{R1} = a_2 S_V^R + b_2 S_H^R \\ S_2^{R2} = c_2 S_V^R + d_2 S_H^R \end{cases},$$

when written in a matrix form, the reference signals are:

$$\begin{bmatrix} S_2^{R1} \\ S_2^{R2} \end{bmatrix} = \begin{bmatrix} a_2 & b_2 \\ c_2 & d_2 \end{bmatrix} \cdot \begin{bmatrix} S_V^R \\ S_H^R \end{bmatrix}, \text{where} \quad (4)$$

$a_2$ and $b_2$ respectively indicate a coupling factor for a V polarization signal that is determined by a position of a first coupling port of the second coupler 34 and a coupling factor for an H polarization signal that is determined by the position of the first coupling port of the second coupler 34; and $c_2$ and $d_2$ respectively indicate a coupling factor for a V polarization signal that is determined by a position of a second coupling port of the second coupler 34 and a coupling factor for an H polarization signal that is determined by the position of the second coupling port of the second coupler 34.

According to the reciprocal theory and the formula (4), the signals $S_V^R$ and $S_H^R$ that are actually output from the second coupler 34 to the receive end by means of coupling are:

$$\begin{bmatrix} S_V^R \\ S_H^R \end{bmatrix} = \begin{bmatrix} a_2 & b_2 \\ c_2 & d_2 \end{bmatrix}^{-1} \cdot \begin{bmatrix} S_2^{R1} \\ S_2^{R2} \end{bmatrix}. \quad (5)$$

Similarly, a coupling factor for a port of the second coupler 34 needs to meet:

$$\text{rank}\left(\begin{bmatrix} a_2 & b_2 \\ c_2 & d_2 \end{bmatrix}\right) \equiv 2. \quad (6)$$

As can be known from the formula (3), the two reference signals acquired by the first coupler 31 by means of coupling are irrelevant; and as can be known from the formula (6), the two interference cancellation signals output by the second coupler 34 by means of coupling are also irrelevant. However, if two interfering signals (referring to the formula (1)) are relevant, the formula (3) and the formula (6) are not required to be workable. A description is provided below under a precondition that the formula (3) and the formula (6) are workable.

Figure 9A:
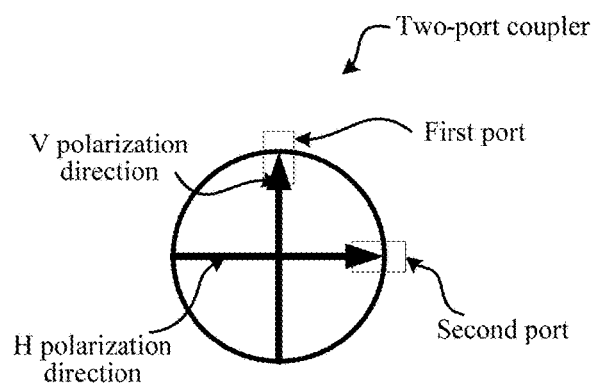
FIG. 9A to FIG. 9C are schematic structural diagrams of coupling ports of a coupler involved in Embodiment 3 of the present invention.
Figure 9B:
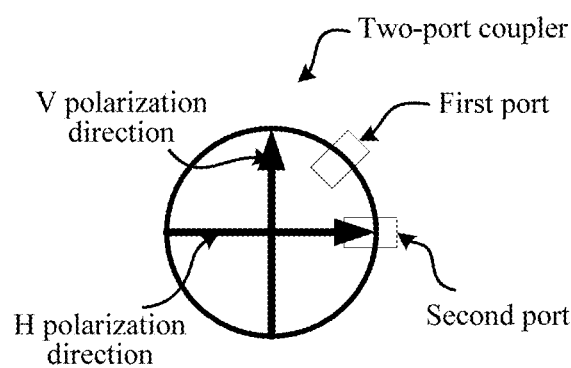
Figure 9C:
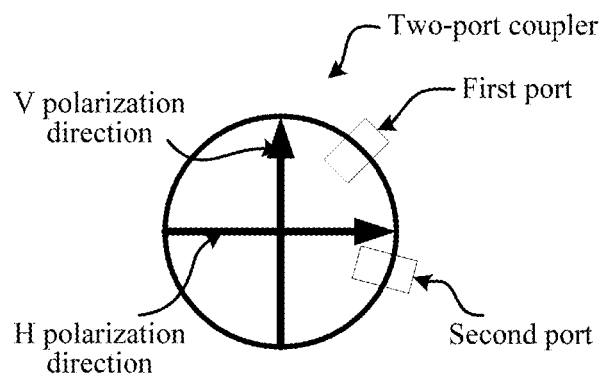

Relevancy between the two reference signals output by the two-port coupler is related to the positions of the two coupling ports of the two-port coupler. As shown in FIG. 9A, the positions of two coupling ports of the two-port coupler (including a two-port coupler 1 and a two-port coupler 2) are separately exactly along directions of two orthogonal polarization signals transmitted in the circular waveguide, and an included angle between the two coupling ports that is determined by the positions of the two coupling ports of the two-port coupler is 90°. One ray is led out from a circle center of a circle shown in the figure to each of two the two coupling ports, and the included angle refers to an included angle formed by the two rays. As shown in FIG. 9B and FIG. 9C, the two coupling ports of the two-port coupler may be further located at other positions in addition to the foregoing positions, and the included angle may also be another angle. That is, an included angle θ between the two coupling output ports of the first coupler 31 meets 0°<|θ|<180°, and an included angle γ between the two coupling output ports of the second coupler 34 meets 0°<|γ|<180°.

Then, the signal recombiner 32 and the channel simulator 33 are specifically described. It should be noted that, when the apparatus 30 is designed, two reference signals may be set to first pass through the signal recombiner 32 and then pass through the channel simulator 33, or two reference signals may be set to first pass through the channel simulator 33 and then pass through the signal recombiner 32. An example in which two reference signals are set to first pass through the signal recombiner 32 and then pass through the channel simulator 33 is used for description below.

Figure 4A:
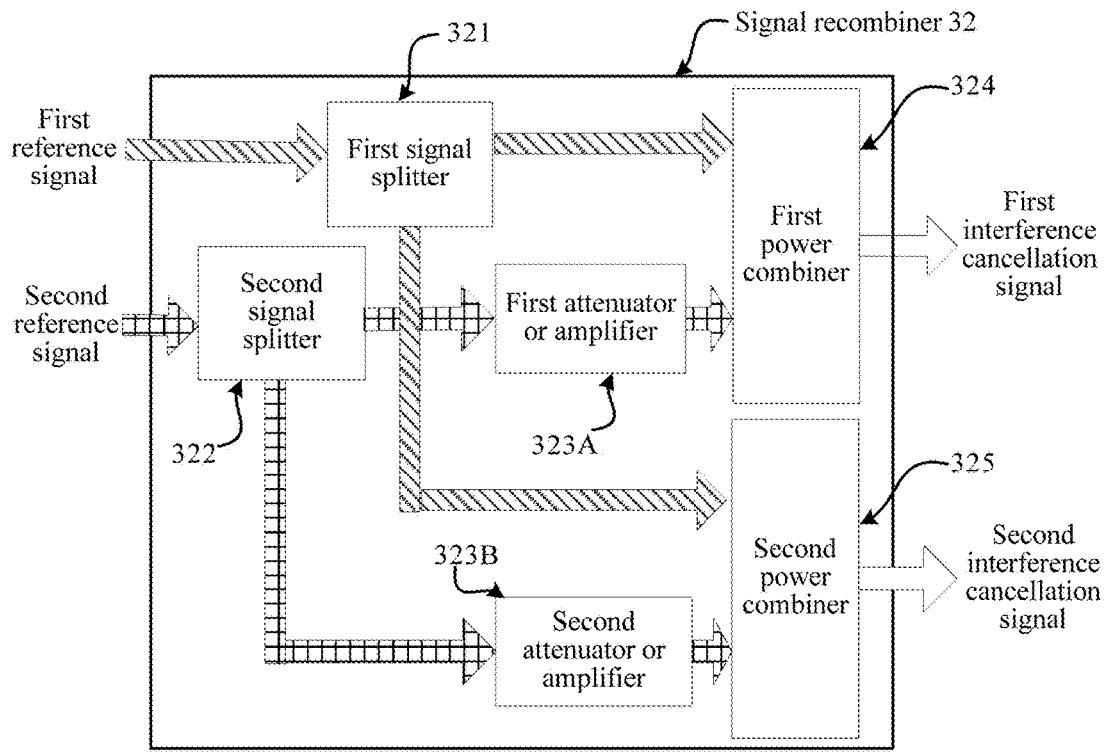
FIG. 4A is a schematic structural diagram of a signal recombiner involved in Embodiment 3 of the present invention.

FIG. 4A is a schematic structural diagram of an embodiment of the signal recombiner 32. The first reference signal and the second reference signal are separately from the two coupling ports of the first coupler 31. As shown in FIG. 4A, the signal recombiner 32 includes:

a first signal splitter 321, configured to split the first reference signal into a first reference sub-signal and a second reference sub-signal;

a second signal splitter 322, configured to split the second reference signal into a third reference sub-signal and a fourth reference sub-signal;

at least two attenuators or amplifiers 323, configured to perform amplitude adjustment on at least two signals of the first reference sub-signal, the second reference sub-signal, the third reference sub-signal, and the fourth reference sub-signal, where the attenuator includes an adjustable attenuator, and the amplifier includes a variable gain amplifier;

a first power combiner 324, configured to combine the first reference sub-signal and the third reference sub-signal into the first interference cancellation signal, where amplitude adjustment is performed by the attenuator or the amplifier 323 on at least one of the signals in the first interference cancellation signal; and a second power combiner 325, configured to combine the second reference sub-signal and the fourth reference sub-signal into the second interference cancellation signal, where amplitude adjustment is performed by the attenuator or the amplifier 323 on at least one of the signals in the second interference cancellation signal.

A setting of the attenuator or the amplifier 323 shown in FIG. 4A is used as an example, and interference cancellation signals $S_m^{R1}$ and $S_m^{R2}$ that are obtained by combination are expressed by using a matrix as:

$$\begin{bmatrix} S_m^{R1} \\ S_m^{R2} \end{bmatrix} = \begin{bmatrix} \alpha & A_1\beta \\ 1-\alpha & A_2(1-\beta) \end{bmatrix} \cdot \begin{bmatrix} S_1^{R1} \\ S_1^{R2} \end{bmatrix}, \text{ where} \quad (7)$$

α indicates a percentage of the first reference sub-signal that is obtained by splitting by the first signal splitter 321 to the first reference signal; β indicates a percentage of the third reference sub-signal that is obtained by splitting by the second signal splitter 322 to the second reference signal; and $A_1$ and $A_2$ are respectively an amount of an amplitude adjusted by a first attenuator or amplifier 323A on the third reference sub-signal and an amount of an amplitude adjusted by a second attenuator or amplifier 323B on the fourth reference sub-signal. By adjusting $A_1$ and $A_2$, the proportion of V polarization signals to H polarization signals in the first interference cancellation signal of the first power combiner 324 can be enabled to meet the first preset proportion, and the proportion of V polarization signals to H polarization signals in the second interference cancellation signal obtained by combination by the second power combiner 325 can be enabled to meet the second preset proportion. Then, the first interference cancellation signal and the second interference cancellation signal are separately sent to the channel simulator 33.

As shown in FIG. 3, corresponding to the two interference cancellation signals output by the signal recombiner 32, the channel simulator 33 may be set to include two subunits, where each subunit is configured to simulate an interference channel $H(A_0, \tau_0, \phi_0)$. For example, the first interference cancellation signal may be enabled to pass through a first subunit of the two subunits, and the second interference cancellation signal may be enabled to pass through a second subunit of the two subunits. In order to cancel an interfering signal that is generated when the transmit signal transmitted by the transmit antenna 22 passes through the interference channel, an interference channel model of the channel simulator 33 needs to be set as $-H(A_0, \tau_0, \phi_0)$, which indicates that an amplitude and a delay of an interference cancellation signal that passes through the channel simulator 33 are the same as an amplitude and a delay of the interfering signal, and a phase difference between the interference cancellation signal and the interfering signal is an odd multiple of 180°. Interference channel models of the two subunits may be set to be the same, for example, both are $-H(A_0, \tau_0, \phi_0)$, and an example in which the interference channel models of the two subunits are the same is used for description below. It should be noted that, in the channel simulator 33, the interference channel models of the two subunits may also be set to be different.

To sum up, a process in which signals $S_1^{R1}$ and $S_1^{R2}$ output by the first coupler 31 pass through the signal recombiner 32 and the channel simulator 33, and are input by the second coupler 34 to the receive end finally by means of coupling may be described by using a mathematical model as:

$$\begin{bmatrix} S_V^R \\ S_H^R \end{bmatrix} = \begin{bmatrix} a_2 & b_2 \\ c_2 & d_2 \end{bmatrix}^{-1} \cdot \begin{bmatrix} -H(A_0, \tau_0, \phi_0) & 0 \\ 0 & -H(A_0, \tau_0, \phi_0) \end{bmatrix} \cdot \begin{bmatrix} \alpha & A_1\beta \\ 1-\alpha & A_2(1-\beta) \end{bmatrix} \cdot \begin{bmatrix} S_1^{R1} \\ S_1^{R2} \end{bmatrix}; \quad (8)$$

and
according to an interference cancellation relationship $$\begin{bmatrix} S_V^R \\ S_H^R \end{bmatrix} = \begin{bmatrix} I_V \\ I_H \end{bmatrix} = \begin{bmatrix} 0 \\ 0 \end{bmatrix}, \text{ and} \quad (9)$$

the formulas (1), (4), and (8), it is obtained that:

$$\begin{bmatrix} a_2 & b_2 \\ c_2 & d_2 \end{bmatrix}^{-1} \cdot \begin{bmatrix} -H(A_0, \tau_0, \phi_0) & 0 \\ 0 & -H(A_0, \tau_0, \phi_0) \end{bmatrix}. \quad (10)$$

-continued $$\begin{bmatrix} \alpha & A_1\beta \\ 1-\alpha & A_2(1-\beta) \end{bmatrix} \cdot \begin{bmatrix} a_1 & b_1 \\ c_1 & d_1 \end{bmatrix} \cdot \begin{bmatrix} S_V^T \\ S_H^T \end{bmatrix} +$$

$$\begin{bmatrix} H(A_0, \tau_0, \phi_0) & 0 \\ 0 & H(A_0, \tau_0, \phi_0) \end{bmatrix} \cdot \begin{bmatrix} \Delta G^2 & \Delta G \cdot \Delta X_{VH} \\ \Delta G \cdot \Delta X_{HV} & 1 \end{bmatrix}.$$

$$\begin{bmatrix} S_V^T \\ S_H^T \end{bmatrix} = \begin{bmatrix} 0 \\ 0 \end{bmatrix},$$

which is simplified as:

$$\begin{bmatrix} a_2 & b_2 \\ c_2 & d_2 \end{bmatrix}^{-1} \cdot \begin{bmatrix} \alpha & A_1\beta \\ 1-\alpha & A_2(1-\beta) \end{bmatrix} \cdot \begin{bmatrix} a_1 & b_1 \\ c_1 & d_1 \end{bmatrix} = \begin{bmatrix} \Delta G^2 & \Delta G \cdot \Delta X_{VH} \\ \Delta G \cdot \Delta X_{HV} & 1 \end{bmatrix}. \quad (11)$$

In order to enable the formula (11) to be established, when the apparatus 30 is designed, the following several points need to be noted:

First, $\alpha$ and $\beta$ cannot both be zero or both be 0, and either one of $\alpha$ and $\beta$ cannot be 0 and the other cannot be 1, and it is expressed by using a mathematical expression as: $\alpha \in [0, 1]$ and $\beta \in (0, 1)$, or $\alpha \in (0, 1)$ and $\beta \in [0, 1]$.

Second, the first attenuator or amplifier 323A is controlled to adjust $A_1$ and the second attenuator or amplifier 323B is controlled to adjust $A_2$ to enable the formula (11) to be established.

Third, the constraint relationship (3) and the formula (6) need to be met.

The formula (10) may be written as:

$$\begin{bmatrix} \alpha & A_1\beta \\ 1-\alpha & A_2(1-\beta) \end{bmatrix} \cdot \begin{bmatrix} a_1 & b_1 \\ c_1 & d_1 \end{bmatrix} \cdot \begin{bmatrix} S_V^T \\ S_H^T \end{bmatrix} = \begin{bmatrix} a_2 & b_2 \\ c_2 & d_2 \end{bmatrix}. \quad (12)$$

$$\begin{bmatrix} \Delta G^2 & \Delta G \cdot \Delta X_{VH} \\ \Delta G \cdot \Delta X_{HV} & 1 \end{bmatrix} \cdot \begin{bmatrix} S_V^T \\ S_H^T \end{bmatrix},$$

where the left of an equal sign in the formula (12) indicates the two interference cancellation signals output by the signal recombiner 32; a 2×1 matrix may be obtained by calculation according to the right of the equal sign in the formula (12), and two elements of the matrix are both expressions of $S_V^T$ and $S_H^T$; in a first element of the matrix, a ratio of a factor of $S_V^T$ to a factor of $S_H^T$ is the first preset proportion; and in the other element of the matrix, a ratio of a factor $S_V^T$ to a factor of $S_H^T$ is the second preset proportion.

In a case in which the formula (11) is established, an interfering signal that is generated in a process in which the transmit signal is received by the local receive antenna 23 from the transmit antenna 22 by using the interference channel can be canceled by the two interference cancellation signals generated by the apparatus 30. Specifically, the first interference cancellation signal that meets the first preset proportion can cancel the first interfering signal received by the V polarization receive antenna, the second interference cancellation signal that meets the second preset proportion can cancel the second interfering signal received by the H polarization receive antenna.

Because the apparatus 30 is skillfully set, only two interference cancellation links and two interference cancellation signals corresponding to the two interference cancellation links are required to cancel four interfering signals including co-polarization interference VV and HH and cross polarization interference VH and HV, and four interference cancellation links are simplified into two interference cancellation links; in addition, decoupling between the channel simulator 33 and the ODU, and decoupling between two ODUs that form an XPIC system are implemented.

It should be noted that, even if the V polarization signal and the H polarization signal in the formula (1) pass through different channels, that is, the two polarization signals pass through different interference channel models, the interfering signal can also be canceled by separately adjusting a delay, an amplitude, and a phase in the channel simulator 33. Correspondingly, in this case, non-zero elements in a matrix of the corresponding channel simulator 33 in the formula (8) should also be different, for example:

$$\begin{bmatrix} -H(A_0, \tau_0, \phi_0) & 0 \\ 0 & -H(A_1, \tau_1, \phi_1) \end{bmatrix}.$$

In this case, according to the formula (10), $$\begin{bmatrix} a_2 & b_2 \\ c_2 & d_2 \end{bmatrix}^{-1} \cdot \begin{bmatrix} -H(A_0, \tau_0, \phi_0) & 0 \\ 0 & -H(A_1, \tau_1, \phi_1) \end{bmatrix} \cdot$$

$$\begin{bmatrix} \alpha & A_1\beta \\ 1-\alpha & A_2(1-\beta) \end{bmatrix} \cdot \begin{bmatrix} a_1 & b_1 \\ c_1 & d_1 \end{bmatrix} \cdot \begin{bmatrix} S_V^T \\ S_H^T \end{bmatrix} +$$

$$\begin{bmatrix} H(A_0, \tau_0, \phi_0) & 0 \\ 0 & H(A_1, \tau_1, \phi_1) \end{bmatrix} \cdot \begin{bmatrix} \Delta G^2 & \Delta G \cdot \Delta X_{VH} \\ \Delta G \cdot \Delta X_{HV} & 1 \end{bmatrix}.$$

$$\begin{bmatrix} S_V^T \\ S_H^T \end{bmatrix} = \begin{bmatrix} 0 \\ 0 \end{bmatrix};$$

and it may be obtained by deformation that:

$$\begin{bmatrix} \alpha & A_1\beta \\ 1-\alpha & A_2(1-\beta) \end{bmatrix} \cdot \begin{bmatrix} a_1 & b_1 \\ c_1 & d_1 \end{bmatrix} \cdot \begin{bmatrix} S_V^T \\ S_H^T \end{bmatrix} = \quad (13)$$

$$\begin{bmatrix} H(A_0, \tau_0, \phi_0) & 0 \\ 0 & H(A_1, \tau_1, \phi_1) \end{bmatrix}^{-1} \cdot \begin{bmatrix} a_2 & b_2 \\ c_2 & d_2 \end{bmatrix}.$$

$$\begin{bmatrix} H(A_0, \tau_0, \phi_0) & 0 \\ 0 & H(A_1, \tau_1, \phi_1) \end{bmatrix} \cdot \begin{bmatrix} \Delta G^2 & \Delta G \cdot \Delta X_{VH} \\ \Delta G \cdot \Delta X_{HV} & 1 \end{bmatrix}.$$

$$\begin{bmatrix} S_V^T \\ S_H^T \end{bmatrix}, \text{where}$$

the left of an equal sign in the formula (13) indicates the two interference cancellation signals output by the signal recombiner 32; a 2×1 matrix may be obtained by calculation according to the right of the equal sign in the formula (13), and two elements of the matrix are both expressions of $S_V^T$ and $S_H^T$; in a first element of the matrix, a ratio of a factor of $S_V^T$ to a factor of $S_H^T$ is the first preset proportion; and in the other element of the matrix, a ratio of a factor $S_V^T$ to a factor of $S_H^T$ is the second preset proportion.

More specifically, the apparatus 30 further includes an external interface, a control circuit, and a power supply circuit. A power supply required by the apparatus 30 may be provided by the external interface and the power supply circuit, the apparatus 30 may communicate with an ODU control signal by using the external interface, and the control circuit is connected to the external interface and receives the ODU control signal, so as to control the signal recombiner 32, the channel simulator 33, and the like.

According to the intra-frequency interference cancellation apparatus that is provided by Embodiment 3 of the present invention, by means of signal recombination, a proportion of V polarization signals to H polarization signals in a first interference cancellation signal can be adjusted randomly, so that the proportion meets a first preset proportion required for canceling a first interfering signal received by a local dual polarization receive antenna; and a proportion of V polarization signals to H polarization signals in a second interference cancellation signal can be adjusted randomly, so that the proportion meets a second preset proportion required for canceling a second interfering signal received by the local dual polarization receive antenna; therefore, only two interference cancellation links corresponding to two interference cancellation signals are required to cancel the interfering signals, and compared with the prior art in which four interference cancellation links are required, the present invention surely simplifies an XPIC system.

Embodiment 4

Figure 4B:
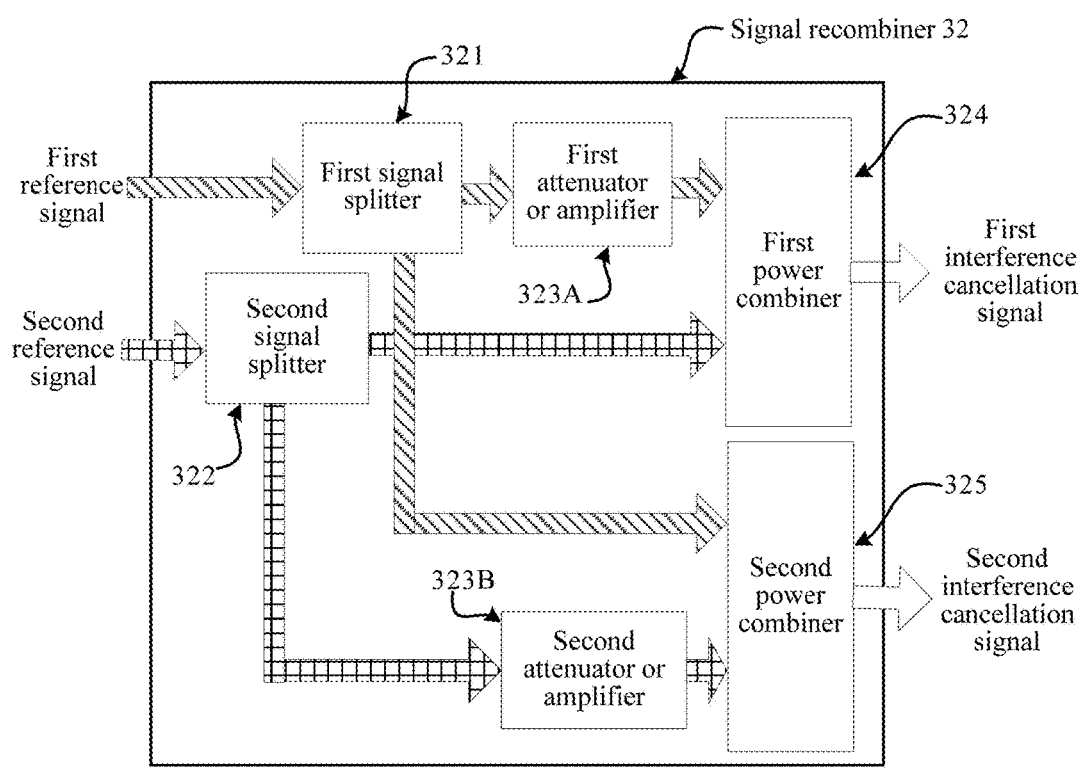
FIG. 4B to FIG. 4D are schematic structural diagrams of a channel simulator involved in Embodiment 4 of the present invention.
Figure 4C:
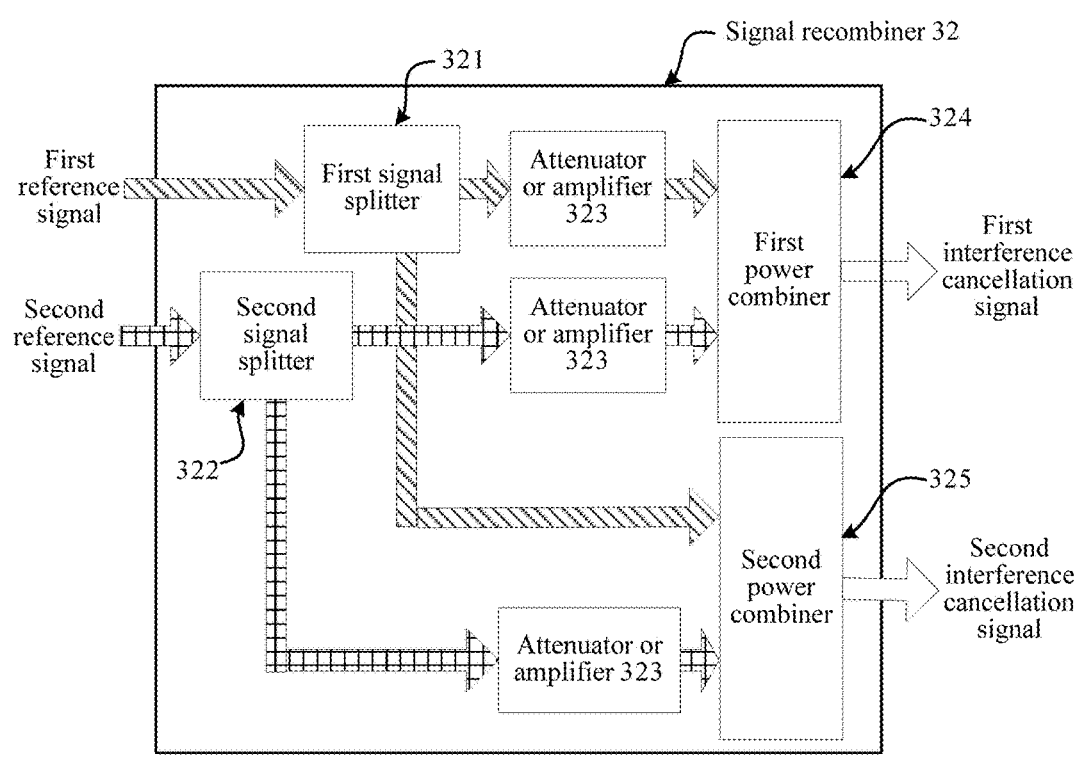
Figure 4D:
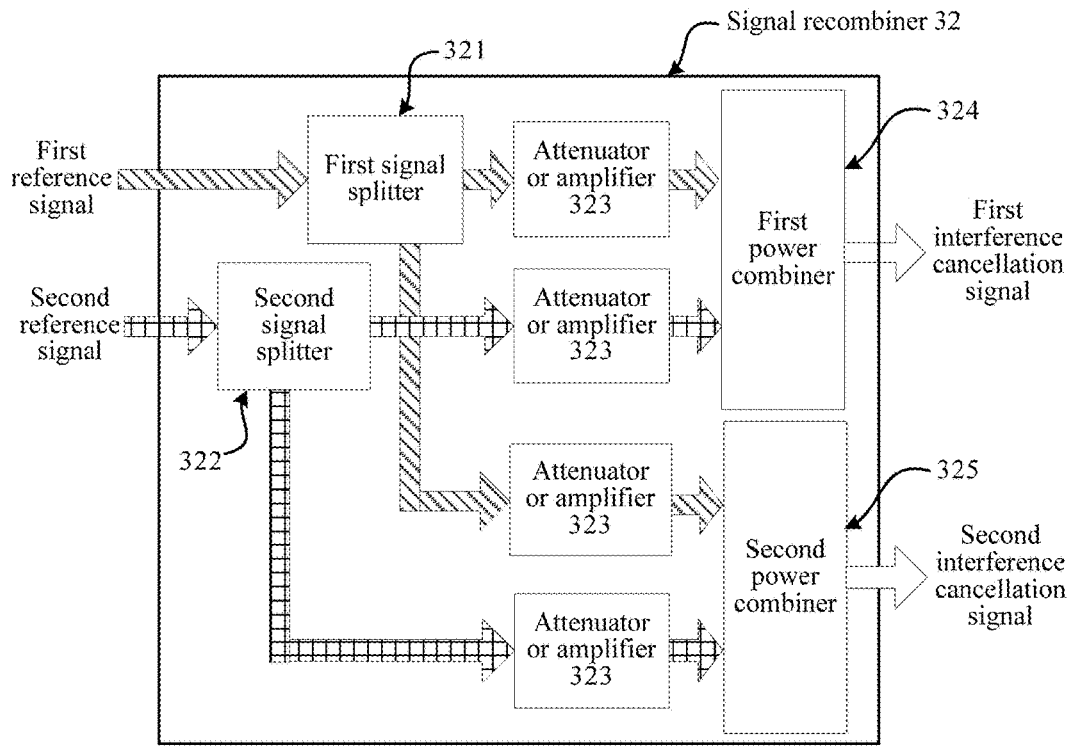

In Embodiment 3, the structure of the signal recombiner 32 is not only limited to what is shown in FIG. 4A, and may be further set to what is shown in FIG. 4B to FIG. 4D, where each signal recombiner 32 includes at least one attenuator or amplifier. According to FIG. 4A to FIG. 4D and the formula (11), it may be summarized that when the apparatus 30 implements interference cancellation, it needs to meet:

$$\begin{bmatrix} a_2 & b_2 \\ c_2 & d_2 \end{bmatrix}^{-1} \cdot \begin{bmatrix} A_3\alpha & A_1\beta \\ A_4(1-\alpha) & A_2(1-\beta) \end{bmatrix} \cdot \begin{bmatrix} a_1 & b_1 \\ c_1 & d_1 \end{bmatrix} = \quad (14)$$

$$\begin{bmatrix} \Delta G^2 & \Delta G \cdot \Delta X_{VH} \\ \Delta G \cdot \Delta X_{HV} & 1 \end{bmatrix},$$

where $A_1$, $A_2$, $A_3$, and $A_4$ are separately amplitude adjustment amounts of four reference signals that are obtained by splitting.

In a case shown in FIG. 4A, $A_3=A_4=1$, where $A_1$ and $A_2$ are adjustable parameters; in a case shown in FIG. 4B, $A_1=A_4=1$, where $A_2$ and $A_3$ are adjustable parameters; in a case shown in FIG. 4C, $A_4=1$, where $A_1$, $A_2$, and $A_3$ are adjustable parameters; and in a case shown in FIG. 4D, $A_1$, $A_2$, $A_3$, and $A_4$ are all adjustable parameters.

The formula (14) can be enabled to be workable by adjusting an adjustable parameter, so as to ensure that an interference cancellation signal generated by the apparatus 30 can cancel an interfering signal received by the receive end.

According to the intra-frequency interference cancellation apparatus that is provided by Embodiment 4 of the present invention, only two interference cancellation links corresponding to two reference signals are required to cancel an interfering signal, and compared with the prior art in which four interference cancellation links are required, the present invention surely simplifies an XPIC system.

Embodiment 5

Although FIG. 4A to FIG. 4D show that the first reference signal acquired by the first coupler 31 by means of coupling is split into two reference sub-signals, and the second reference signal is split into two reference sub-signals, in the present invention, only one signal in the two reference signals acquired by the first coupler 31 by means of coupling may be split into two reference sub-signals.

Figure 5:
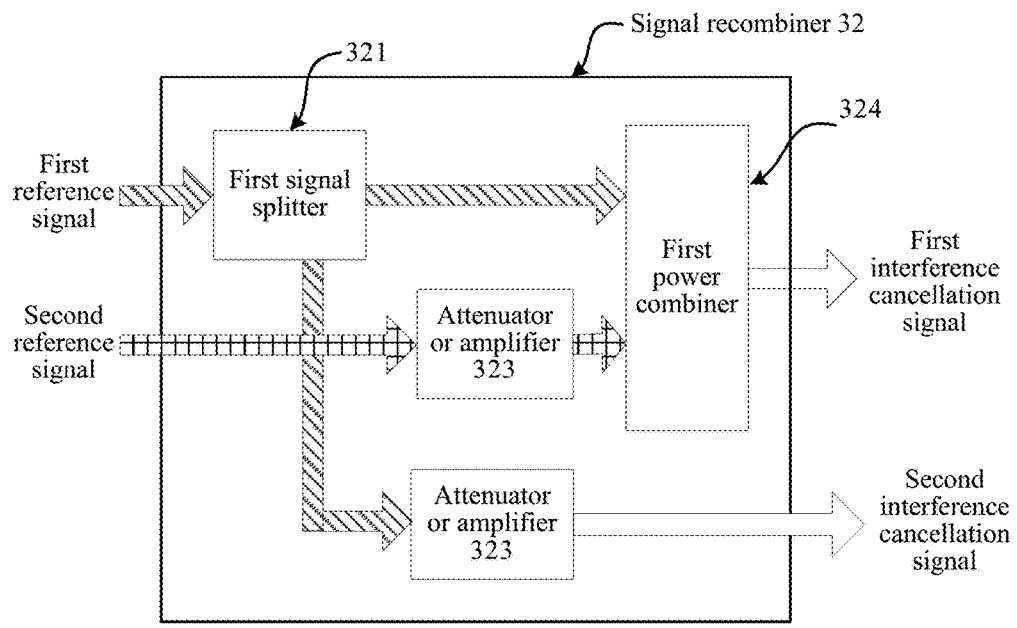
FIG. 5 is a schematic structural diagram of a signal recombiner involved in Embodiment 5 of the present invention.

As shown in FIG. 5, the signal recombiner 32 includes:

a first signal splitter 321, configured to split the first reference signal into a first reference sub-signal and a second reference sub-signal;

at least one attenuator or amplifier 323, configured to perform amplitude adjustment on at least one signal of the first reference sub-signal and the second reference signal; and a first power combiner 324, configured to combine the first reference sub-signal and the second reference signal into the first interference cancellation signal, where the second reference sub-signal is used as the second interference cancellation signal.

Optionally, for the second reference sub-signal: first, the attenuator or the amplifier 323 in the signal recombiner 32 may be first used to perform amplitude adjustment on the second reference sub-signal, and then, the second reference sub-signal is adjusted in the channel simulator 33; second, amplitude adjustment may be not performed on the second reference sub-signal in the signal recombiner 32, but amplitude adjustment is performed on the second reference sub-signal in the channel simulator 33. In the foregoing first case, in the channel simulator 33, the first interference cancellation signal and the second interference cancellation signal pass through a same simulated interference channel, that is, the subunits of the channel simulator are the same (referring to FIG. 3). In the foregoing second case, in the channel simulator 33, the first interference cancellation signal and the second interference cancellation signal pass through different simulated interference channels, that is, the subunits of the channel simulator are different (referring to FIG. 3). The first case is used as an example for description in the following descriptions.

Specifically, assuming that $A_3=1$ and $\beta=1$, the formula (14) may be simplified as:

$$\begin{bmatrix} a_2 & b_2 \\ c_2 & d_2 \end{bmatrix}^{-1} \cdot \begin{bmatrix} \alpha & A_1 \\ A_4(1-\alpha) & 0 \end{bmatrix} \cdot \begin{bmatrix} a_1 & b_1 \\ c_1 & d_1 \end{bmatrix} = \quad (15)$$

$$\begin{bmatrix} \Delta G^2 & \Delta G \cdot \Delta X_{VH} \\ \Delta G \cdot \Delta X_{HV} & 1 \end{bmatrix}.$$

The formula (15) can be enabled to be workable by adjusting the adjustable parameters $A_1$ and $A_4$, so as to ensure that the two interference cancellation signals generated by the apparatus 30 can cancel the first interfering signal and the second interfering signal that are received by the local receive end.

According to the intra-frequency interference cancellation apparatus that is provided by Embodiment 5 of the present invention, an XPIC system can be simplified, and compared with Embodiment 4, a signal recombiner 32 can be further simplified.

Embodiment 6

Although FIG. 4A to FIG. 4D show that each of the two reference signals acquired by the first coupler 31 by means of coupling are split into two signals, in the present invention, each of the two reference signals acquired by the first coupler 31 by means of coupling may be split into more than two signals, to cancel multipath interference.

If there are two interference paths through which a transmit signal is transmitted from the transmit antenna 22 to the receive antenna 23, for example, an obstruction such as a radome covers the transmit antenna 22 and the receive antenna 23 under the obstruction, to enable the transmit antenna 22 to reach the receive antenna 23 through refraction of the obstruction, two interference channel models $H(A_0, \tau_0, \phi_0)$ and $H(\Delta'_0, \tau'_0, \phi'_0)$ exist, and each of the two reference signals acquired by the first coupler 31 by means of coupling may be split into four signals. If there are N interference paths through which a transmit signal is transmitted from the transmit antenna 22 to the receive antenna 23 (where N is an integer greater than or equal to 2), each of the two reference signals acquired by the first coupler 31 by means of coupling may be split into 2N signals.

Figure 6:
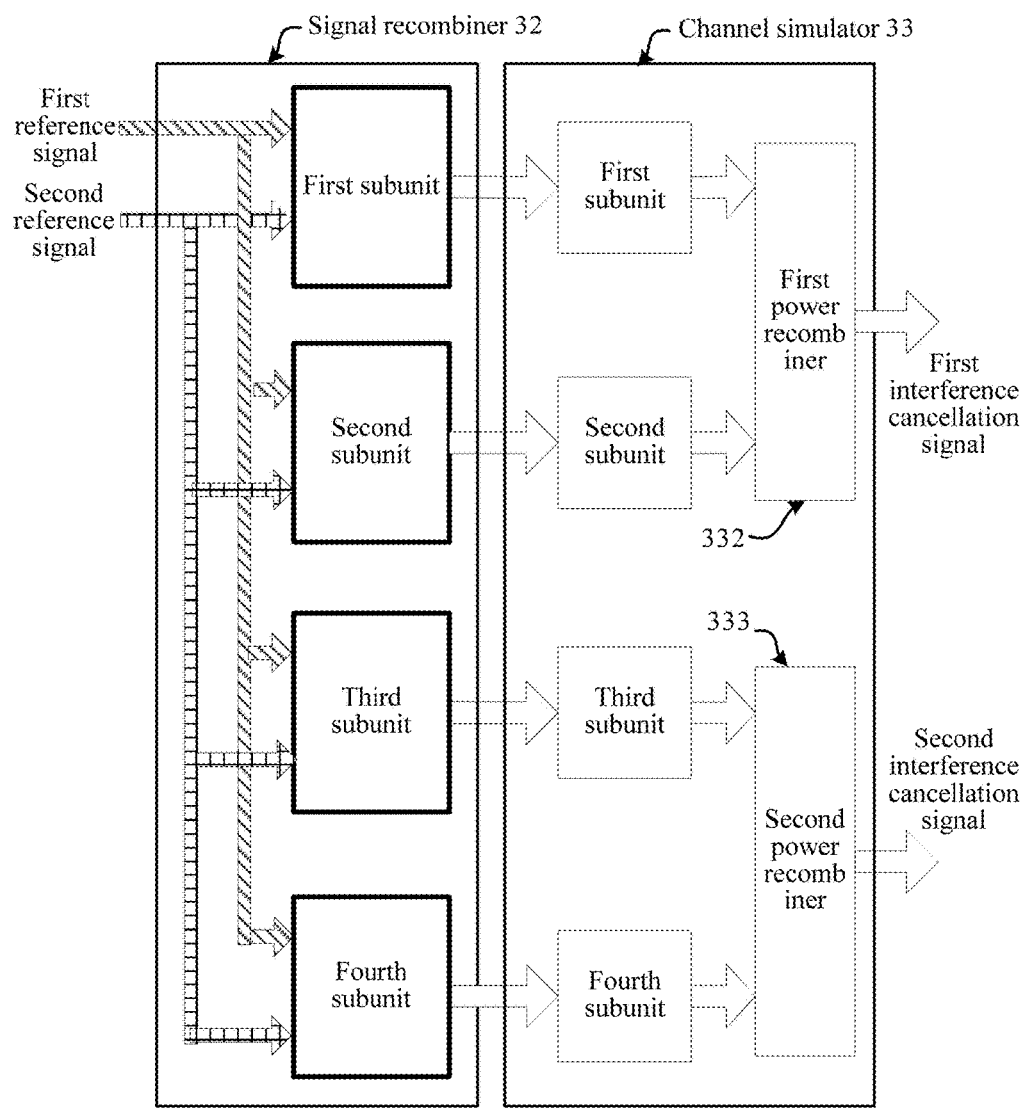
FIG. 6 is a schematic structural diagram of a signal recombiner and a channel simulator that are involved in Embodiment 6 of the present invention.

In this embodiment, for the general structure of the intra-frequency interference cancellation apparatus 30, reference may be made to FIG. 3. As shown in FIG. 6, corresponding to multipath interference, the signal recombiner 32 may include two signal splitters and multiple subunits, where the multiple subunits include at least N attenuators or amplifiers and at least N power combiners in total.

The two signal splitters are configured to split each of the first reference signal and the second reference signal into N to 2N reference sub-signals, where a total quantity of the reference sub-signals is 3N to 4N.

The at least N attenuators or amplifiers are configured to perform amplitude adjustment on at least N signals of the 3N to 4N reference sub-signals.

The at least N power combiners are configured to combine any two reference sub-signals into one interference cancellation signal, to obtain 2N interference cancellation signals including a reference sub-signal that is not combined, where the combined two reference sub-signals are reference signals that are from different paths and amplitude adjustment is performed on at least one reference sub-signal of the two reference sub-signals, a proportion of V polarization signals to H polarization signals in N interference cancellation signals meets a first preset proportion, and a proportion of V polarization signals to H polarization signals in the other N interference cancellation signals meets a second preset proportion. The power combiners are separately included in the subunits of the signal recombiner 32.

Corresponding to the multipath interference, the intra-frequency interference cancellation apparatus 30 may include a channel simulator 33 having 2N subunits, a first power recombiner 332, and a second power recombiner 333.

For the channel simulator 33, N subunits are configured to adjust the N interference cancellation signals that meet the first preset proportion, so that amplitudes and delays of the N interference cancellation signals are the same as amplitudes and delays of the N first interfering signals respectively, and differences between phases of the N interference cancellation signals and phases of the N first interfering signals are an odd number times 180° each, and the other N subunits are configured to adjust the N interference cancellation signals that meet the second preset proportion, so that amplitudes and delays of the N interference cancellation signals are the same as amplitudes and delays of the N second interfering signals respectively, and differences between phases of the N interference cancellation signals and phases of the N second interfering signals are an odd number times 180° each.

The first power recombiner 332 is configured to recombine the N interference cancellation signals that meet the first preset proportion into a first interference cancellation signal.

The second power recombiner 333 is configured to recombine the N interference cancellation signals that meet the second preset proportion into a second interference cancellation signal.

As shown in FIG. 6 (N=2 is used as an example), for brevity, only four subunits included in the signal recombiner 32 are shown, the attenuator or the amplifier and the power combiner in the signal recombiner 32 are not shown; in addition, the two signal splitters are not shown either. An attenuator or amplifier and a power combiner in a subunit are set in multiple manners, and for details, reference may be made to FIG. 4A to FIG. 4D and FIG. 5. It may be understood that, a subunit corresponds to a part of rather than all of the signal recombiner 32 in FIG. 4A to FIG. 4D and FIG. 5. Using FIG. 4A as an example, a first subunit may correspondingly include the first attenuator or amplifier 323A and the first power combiner 324; and a second subunit may correspondingly include the second attenuator or amplifier 323B and the second power combiner 325.

According to the intra-frequency interference cancellation apparatus that is provided by Embodiment 6 of the present invention, for multipath interfering signals, compared with the prior art, only a half of interference cancellation links are required to cancel all interfering signals; therefore, the present invention simplifies an XPIC system when multipath interference exists.

Embodiment 7

Figure 7:
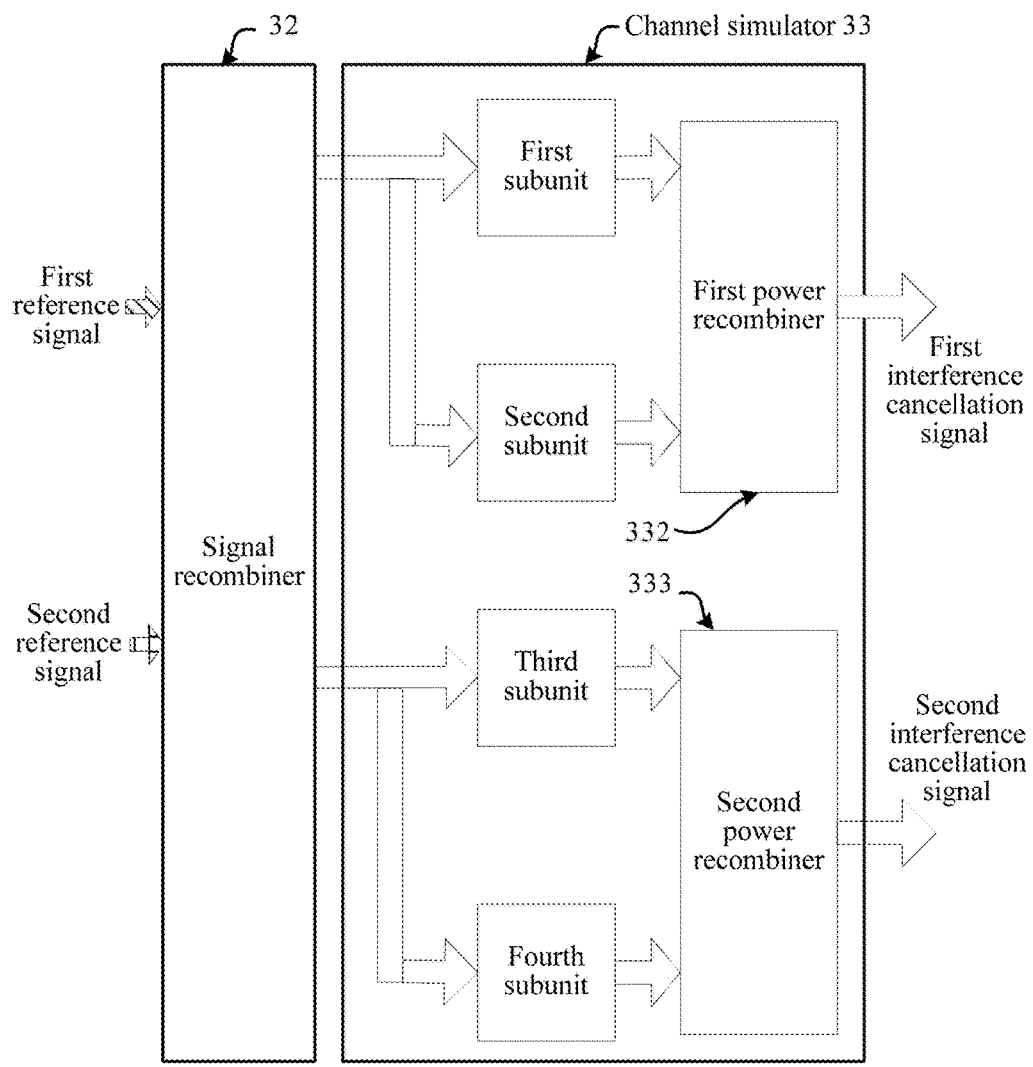
FIG. 7 is a schematic structural diagram of an intra-frequency interference cancellation apparatus according to Embodiment 7 of the present invention.

In FIG. 7, the signal recombiner 32 may be set in multiple manners, and for details, reference may be made to FIG. 4A to FIG. 4D and FIG. 5. The channel simulator 33 that is configured to simulate different interference channels and that includes multiple subunits may be set. For example, interfering signals are multipath interfering signals (where there are N interference paths), and the multipath interfering signals include N first interfering signals received by the V polarization receive antenna and N second interfering signals received by the H polarization receive antenna; in this case, the apparatus 30 further includes:

a third signal splitter (not shown in the figure), configured to split the first interference cancellation signal into N sub-signals;

a fourth signal splitter (not shown in the figure), configured to split the second interference cancellation signal into N sub-signals, where for the channel simulator, N subunits are separately configured to adjust the N sub-signals that are obtained by splitting by the third signal splitter, so that amplitudes and delays of the N sub-signals that are obtained by splitting by the third signal splitter are the same as amplitudes and delays of the N first interfering signals respectively, and differences between phases of the N sub-signals that are obtained by splitting by the third signal splitter and phases of the N first interfering signals are an odd number times 180° each, and the other N subunits are separately configured to adjust the N sub-signals that are obtained by splitting by the fourth signal splitter, so that amplitudes and delays of the N sub-signals that are obtained by splitting by the fourth signal splitter are the same as amplitudes and delays of the N second interfering signals respectively, and differences between phases of the N sub-signals that are obtained by splitting by the fourth signal splitter and phases of the N second interfering signals are an odd number times 180° each. As shown in FIG. 7, N=2 is used as an example, a first subunit may be configured to simulate an interference channel $-H(A_0, \tau_0, \phi_0)$; a second subunit may be configured to simulate an interference channel $-H(A'_0, \tau'_0, \phi'_0)$; a third subunit may be set to be the same as the first subunit; and a fourth subunit may be set to be the same as the second subunit; and two power recombiners 332 and 333, configured to recombine, into two interference cancellation signals, the 2N sub-signals that are adjusted by 2N channel simulators.

This embodiment may be used to cancel multipath interfering signals having N interference paths, and simplifies an XPIC system.

Embodiment 8

Figure 8:
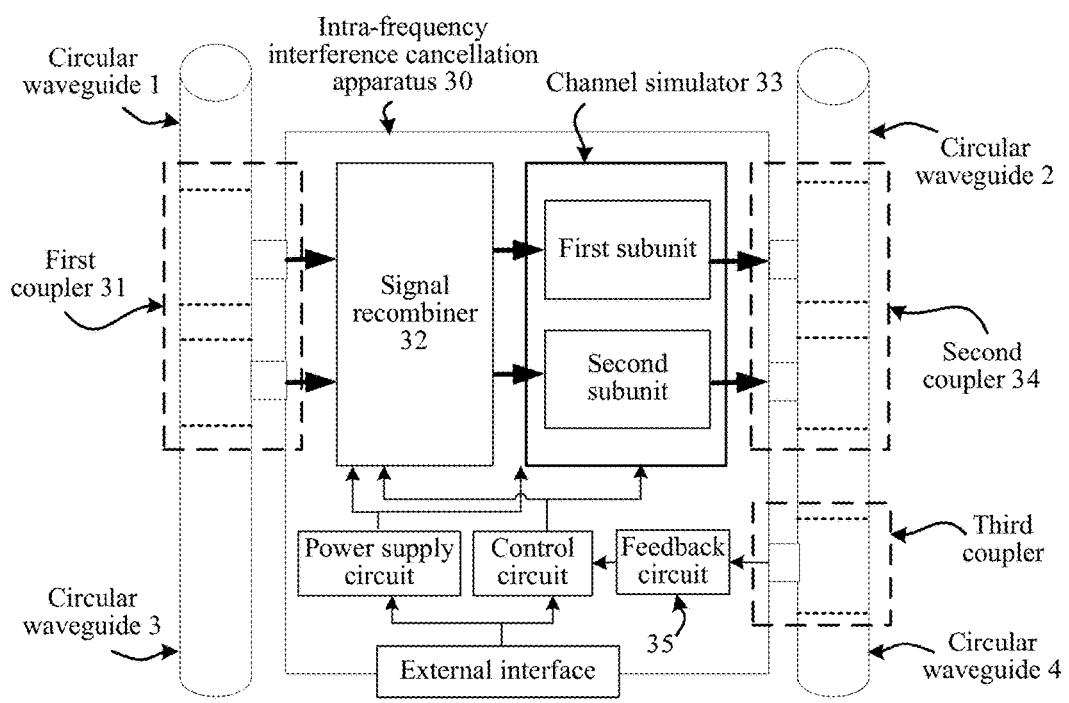
FIG. 8 is a schematic structural diagram of a channel simulator involved in Embodiment 8 of the present invention.

As shown in FIG. 8, based on Embodiment 3 to Embodiment 7, the apparatus 30 further includes: a feedback circuit 35, configured to perform coupling to acquire a feedback signal from the local receive end, and adjust the first interference cancellation signal and the second interference cancellation signal according to the feedback signal.

Specifically, in this embodiment, a third coupler may be added between the circular waveguide 4 and the second coupler 34. The third coupler is connected to the second coupler 34 by using the circular waveguide, and acquire, by means of coupling, a received signal transmitted from the second coupler 34 to the circular waveguide 4. The third coupler may be a two-port coupler, or may be a single-port coupler. The third coupler transmits the feedback signal to the feedback unit 35, and then, the feedback unit 35 adjusts the interference cancellation signals according to the feedback signal by controlling the channel simulator 33 and the signal recombiner 32. For example, the third coupler performs coupling to acquire a power signal from the local receive end, the feedback circuit 35 converts the power signal into a voltage signal, and the control circuit acquires the voltage signal and adjusts the interference cancellation signals according to the voltage signal.

According to the intra-frequency interference cancellation apparatus that is provided by Embodiment 8 of the present invention, an XPIC system can be simplified, and in addition, an interference cancellation effect can be optimized by adjusting interference cancellation signals.

Embodiment 9

Figure 10:
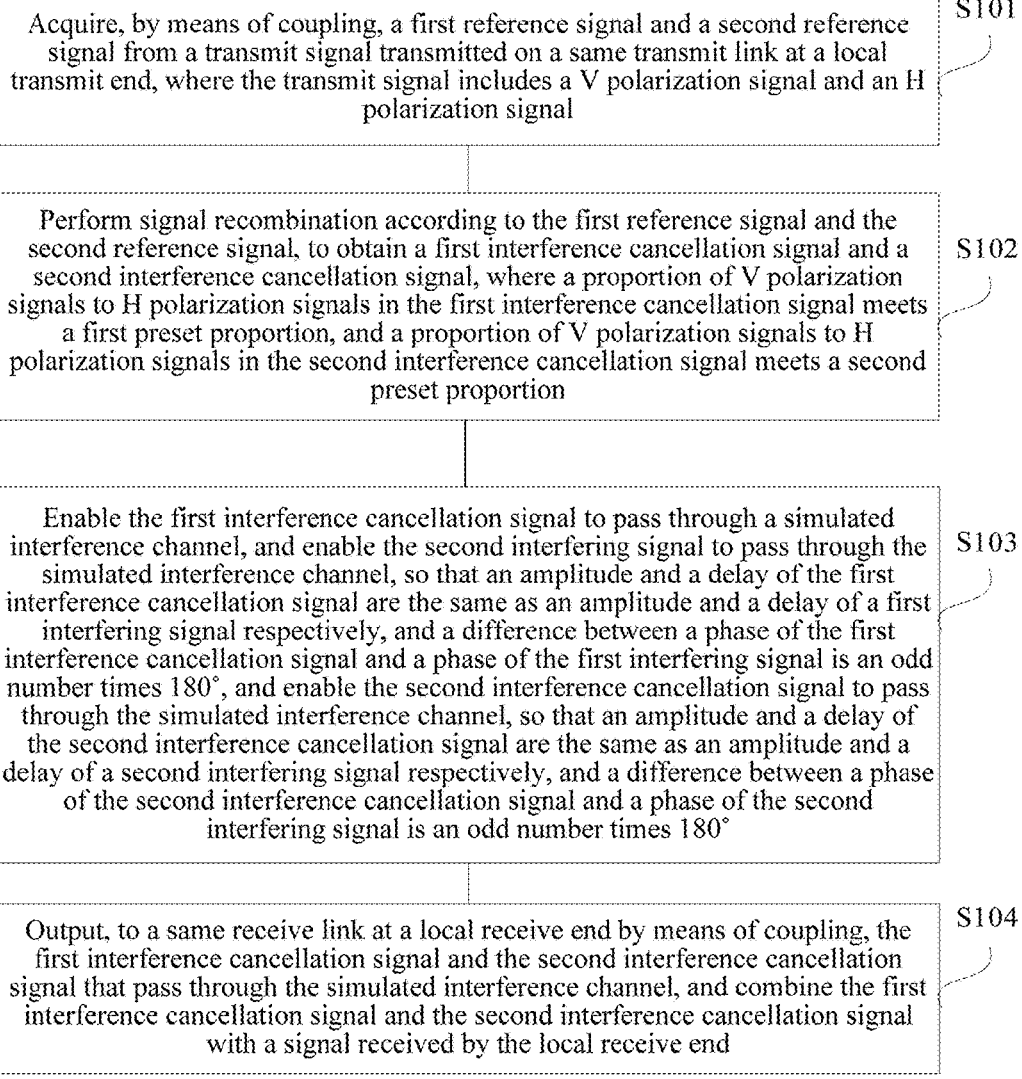
FIG. 10 is a flowchart of an intra-frequency interference cancellation method according to Embodiment 9 of the present invention.

Corresponding to the intra-frequency interference cancellation apparatuses that are provided by Embodiment 3 to Embodiment 5 and Embodiment 7 and Embodiment 8 of the present invention, Embodiment 9 of the present invention provides an intra-frequency interference cancellation method, used to cancel interfering signals that are formed by a local transmit end and that interfere a local receive end, where the interfering signals include a first interfering signal received by a V polarization receive antenna and a second interfering signal received by an H polarization receive antenna. FIG. 10 is a flowchart of the intra-frequency interference cancellation method according to Embodiment 9 of the present invention. As shown in FIG. 10, the method includes the following steps:

S101: Perform coupling to acquire a first reference signal and a second reference signal from a transmit signal transmitted on a same transmit link at the local transmit end, where the transmit signal includes a V polarization signal and an H polarization signal.

In this step, a two-port coupler may be used to acquire, by means of coupling, the first reference signal and the second reference signal from the transmit signal transmitted on the same transmit link at the transmit end. The two-port coupler may be disposed on a transmission line (for example, a circular waveguide) between a transmit polarization combiner and a transmit antenna.

S102: Perform signal recombination according to the first reference signal and the second reference signal, to obtain a first interference cancellation signal and a second interference cancellation signal, where a proportion of V polarization signals to H polarization signals in the first interference cancellation signal meets a first preset proportion, and a proportion of V polarization signals to H polarization signals in the second interference cancellation signal meets a second preset proportion.

In this step, signal recombination may be performed by referring to the working principle of the signal recombiner 32 in Embodiment 3 to Embodiment 5 and Embodiment 7 and Embodiment 8. For settings of the first preset proportion and the second preset proportion, reference may be made to the formula (12).

S103: Enable the first interference cancellation signal to pass through a simulated interference channel, so that an amplitude and a delay of the first interference cancellation signal are the same as an amplitude and a delay of a first interfering signal respectively, and a difference between a phase of the first interference cancellation signal and a phase of the first interfering signal is an odd number times 180°, and enable the second interference cancellation signal to pass through the simulated interference channel, so that an amplitude and a delay of the second interference cancellation signal are the same as an amplitude and a delay of a second interfering signal respectively, and a difference between a phase of the second interference cancellation signal and a phase of the second interfering signal is an odd number times 180°.

In this step, signal processing may be performed by referring to the working principle of the channel simulator 33 in Embodiment 3 to Embodiment 5 and Embodiment 7 and Embodiment 8. Because the amplitudes and the delays of the two interference cancellation signals are the same as the amplitudes and the delays of the interfering signals, and the differences between the phases of the two interference cancellation signals and the phases of the interfering signals are an odd number times 180°, the two interference cancellation signals can cancel the interfering signals generated in a process in which the transmit signal is transmitted from the transmit end to the receive end.

S104: Output, to a same receive link at the local receive end by means of coupling, the first interference cancellation signal and the second interference cancellation signal that have passed through the simulated interference channel, and combine the first interference cancellation signal and the second interference cancellation signal with a signal received by the local receive end.

In this step, the two-port coupler may be used to output the two interference cancellation signals to the local receive end by means of coupling. The two-port coupler may be disposed on a transmission line (for example, a circular waveguide) between a receive polarization combiner and a receive antenna.

Because the first interfering signal and the second interfering signal that are received by the local receive end are generally irrelevant, the two reference signals are required to be irrelevant, and the two interference cancellation signals are also required to be irrelevant. In specific implementation, a two-port coupler whose coupling factor separately meets the formula (3) and the formula (6) may be selected. If the first interfering signal is relevant to the second interfering signal, the formula (3) and the formula (6) are not required to be workable.

It should be noted that, S102 may be performed before S103 or may be performed after S103.

According to the intra-frequency interference cancellation method that is provided by Embodiment 9 of the present invention, by means of signal recombination, a proportion of V polarization signals to H polarization signals in a first interference cancellation signal can be adjusted randomly, so that the proportion meets a first preset proportion required for canceling a first interfering signal received by a local dual polarization receive antenna; and a proportion of V polarization signals to H polarization signals in a second interference cancellation signal can be adjusted randomly, so that the proportion meets a second preset proportion required for canceling a second interfering signal received by the local dual polarization receive antenna; therefore, only two interference cancellation links corresponding to two interference cancellation signals are required to cancel the interfering signals, and compared with the prior art in which four interference cancellation links are required, the present invention surely simplifies an XPIC system.

In a specific embodiment of Embodiment 9, when S102 is performed, the first reference signal may be first split into a first reference sub-signal and a second reference sub-signal, and the second reference signal is split into a third reference sub-signal and a fourth reference sub-signal; second, amplitude adjustment is performed on at least two signals of the first reference sub-signal, the second reference sub-signal, the third reference sub-signal, and the fourth reference sub-signal; third, the first reference sub-signal and the third reference sub-signal are combined into the first interference cancellation signal, and the second reference sub-signal and the fourth reference sub-signal are combined into the second interference cancellation signal, where amplitude adjustment is performed on at least one of the signals in the first interference cancellation signal, and amplitude adjustment is performed on at least one of the signals in the second interference cancellation signal.

In another specific embodiment of Embodiment 9, when S102 is performed, the first reference signal may be first split into a first reference sub-signal and a second reference sub-signal; second, amplitude adjustment is performed on at least one signal of the first reference sub-signal and the second reference signal; and third, the first reference sub-signal and the second reference signal are combined into the first interference cancellation signal, and the second reference sub-signal is used as the second interference cancellation signal. The method provided by the specific embodiment can further simplify an XPIC system.

In still another specific embodiment of Embodiment 9, the interfering signals are multipath interfering signals, there are N interference paths, the multipath interfering signals include N first interfering signals received by a V polarization receive antenna and N second interfering signals received by an H polarization receive antenna. When S103 is performed, each of the first interference cancellation signal and the second interference cancellation signal may be first split into N sub-signals; second, the N sub-signals that are obtained by splitting the first interference cancellation signal are enabled to separately pass through N simulated interference channels corresponding to the N interference paths, so that amplitudes and delays of the N sub-signals that are obtained by splitting the first interference cancellation signal are the same as amplitudes and delays of the N first interfering signals respectively, and differences between phases of the N sub-signals that are obtained by splitting the first interference cancellation signal and phases of the N first interfering signals are an odd number times 180°, and the N sub-signals that are obtained by splitting the second interference cancellation signal are enabled to separately pass through the N simulated interference channels corresponding to the N interference paths, so that amplitudes and delays of the N sub-signals that are obtained by splitting the second interference cancellation signal are the same as amplitudes and delays of the N second interfering signals respectively, and differences between phases of the N sub-signals that are obtained by splitting the second interference cancellation signal and phases of the N second interfering signals are an odd number times 180° each; and third, the 2N sub-signals that have passed through the simulated interference channel are recombined into two interference cancellation signals. The method provided by the specific embodiment can simplify an XPIC system in a case of multipath interference.

In Embodiment 9 and multiple specific embodiments of Embodiment 9, after the first interference cancellation signal and the second interference cancellation signal that have passed through the simulated interference channel are output to the receive link at the local receive end by means of coupling, coupling may be performed to acquire a feedback signal from the local receive end, and the first interference cancellation signal and the second interference cancellation signal are adjusted according to the feedback signal. Therefore, an interference cancellation effect can be optimized.

Embodiment 10

Corresponding to the intra-frequency interference cancellation apparatus that is provided by Embodiment 6 of the present invention, Embodiment 10 of the present invention provides an intra-frequency interference cancellation method, used to cancel multipath interfering signals that are formed by a local transmit end and that interfere a local receive end, where there are N interference paths, the multipath interfering signals include N first interfering signals received by a V polarization receive antenna and N second interfering signals received by an H polarization receive antenna. FIG. 11 is a flowchart of the intra-frequency interference cancellation method according to Embodiment 10 of the present invention. As shown in FIG. 11, the method includes:

S111: Perform coupling to acquire a first reference signal and a second reference signal from a transmit signal transmitted on a same transmit link at the local transmit end, where the transmit signal includes a V polarization signal and an H polarization signal.

This step is the same as S101 in Embodiment 9.

S112: Split each of the first reference signal and the second reference signal into N to 2N reference sub-signals, where a total quantity of the reference sub-signals is 3N to 4N.

In this step, first, each of the two reference signals may be split into 2N reference sub-signals; second, either reference signal may be split into 2N reference sub-signals, and the other reference signal is split into N to 2N−1 reference sub-signals; and third, each of the two reference signals is split into N to 2N−1 reference sub-signals.

S113: Perform amplitude adjustment on at least N signals of the 3N to 4N reference sub-signals, and combine any two reference sub-signals into one interference cancellation signal, to obtain 2N interference cancellation signals including a reference sub-signal that is not combined.

In this step, for a manner of amplitude adjustment and power combination, reference may be made to the descriptions of the foregoing embodiments. For example, amplitude adjustment and power combination may be performed with reference to FIG. 6, FIG. 4A to FIG. 4D, and FIG. 5. The combined two reference sub-signals are reference signals that are from different paths and amplitude adjustment is performed on at least one reference sub-signal of the two reference sub-signals, a proportion of V polarization signals to H polarization signals in N interference cancellation signals meets a first preset proportion, and a proportion of V polarization signals to H polarization signals in the other N interference cancellation signals meets a second preset proportion.

S114: Enable the N interference cancellation signals that meet the first preset proportion to separately pass through N simulated interference channels corresponding to the N interference paths, so that amplitudes and delays of the N interference cancellation signals are the same as amplitudes and delays of the N first interfering signals respectively, and differences between phases of the N interference cancellation signals and phases of the N first interfering signals are an odd number times 180° each, and enable the other N interference cancellation signals that meet the second preset proportion to separately pass through the N simulated interference channels corresponding to the N interference paths, so that amplitudes and delays of the other N interference cancellation signals are the same as amplitudes and delays of the N second interfering signals respectively, and differences between phases of the other N interference cancellation signals and phases of the N second interfering signals are an odd number times 180° each.

S115: After the simulated interference channels are passed through, recombine the N interference cancellation signals that meet the first preset proportion into a first interference cancellation signal, and recombine the N interference cancellation signals that meet the second preset proportion into a second interference cancellation signal.

S116: Output the first interference cancellation signal and the second interference cancellation signal to a same receive link at the local receive end by means of coupling, and combine the first interference cancellation signal and the second interference cancellation signal with a signal received by the local receive end.

This step is the same as S104 in Embodiment 9.

It should be noted that, specific implementation processes of S112 to S115 may be performed by referring to Embodiment 6, but are not limited to an implementation manner shown in Embodiment 6.

In Embodiment 10, the two reference signals may be irrelevant, and for details, reference may be made to the foregoing embodiments.

The same as Embodiment 9, after the first reference signal and the second reference signal are output to a receive link at the local receive end by means of coupling, the method further includes: acquiring a feedback signal from the local receive end by means of coupling; and adjusting the first interference cancellation signal and the second interference cancellation signal according to the feedback signal.

The method provided by Embodiment 10 can simplify an XPIC system when multipath interference exists.

The embodiments in this specification are described with focuses, for same or similar parts in the embodiments, reference may be made to these embodiments, and each embodiment focuses on a difference from other embodiments. Especially, a method embodiment is basically similar to an apparatus embodiment, and therefore is described briefly; for related parts, reference may be made to partial descriptions in the apparatus embodiment.

It should be noted that the described apparatus embodiment is merely exemplary. The units described as separate parts may or may not be physically separate, and parts displayed as units may or may not be physical units, may be located in one position, or may be distributed on multiple network units. Some or all of the modules may be selected according to actual requirements to achieve the objectives of the solutions of the embodiments. In addition, in the accompanying drawings of the apparatus embodiments provided by the present invention, connection relationships between the modules indicate that the modules have communication connections with each other, which may be specifically implemented as one or more communications buses or signal cables. A person of ordinary skill in the art may understand and implement the embodiments of the present invention without creative efforts.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as a "circuit", "module", or "system" herein. In addition, each aspect of the present invention or the possible implementation manner of each aspect may use a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An intra-frequency interference cancellation method, used to cancel interfering signals that are formed by a local transmit end and that interfere a local receive end, wherein the interfering signals comprise a first interfering signal received by a V polarization receive antenna and a second interfering signal received by an H polarization receive antenna, comprising:

performing coupling to acquire a first reference signal and a second reference signal from a transmit signal transmitted on a same transmit link at the transmit end, wherein the transmit signal comprises a V polarization signal and an H polarization signal;

performing signal recombination according to the first reference signal and the second reference signal, to obtain a first interference cancellation signal and a second interference cancellation signal, wherein a proportion of V polarization signals to H polarization signals in the first interference cancellation signal meets a first preset proportion, and a proportion of V polarization signals to H polarization signals in the second interference cancellation signal meets a second preset proportion;

enabling the first interference cancellation signal to pass through a simulated interference channel, so that an amplitude and a delay of the first interference cancellation signal are the same as an amplitude and a delay of the first interfering signal respectively, and a difference between a phase of the first interference cancellation signal and a phase of the first interfering signal is an odd number times 180°, and enabling the second interference cancellation signal to pass through the simulated interference channel, so that an amplitude and a delay of the second interference cancellation signal are the same as an amplitude and a delay of the second interfering signal respectively, and a difference between a phase of the second interference cancellation signal and a phase of the second interfering signal is an odd number times 180°; and outputting, to a same receive link at the local receive end by means of coupling, the first interference cancellation signal and the second interference cancellation signal that have passed through the simulated interference channel, and combining the first interference cancellation signal and the second interference cancellation signal with a signal received by the local receive end.

2. The method according to claim 1, wherein the first reference signal is irrelevant to the second reference signal.

3. The method according to claim 1, wherein the performing signal recombination according to the first reference signal and the second reference signal, to obtain a first interference cancellation signal and a second interference cancellation signal comprises:

splitting the first reference signal into a first reference sub-signal and a second reference sub-signal, and splitting the second reference signal into a third reference sub-signal and a fourth reference sub-signal;

performing amplitude adjustment on at least two signals of the first reference sub-signal, the second reference sub-signal, the third reference sub-signal, and the fourth reference sub-signal; and combining the first reference sub-signal and the third reference sub-signal into the first interference cancellation signal, and combining the second reference sub-signal and the fourth reference sub-signal into the second interference cancellation signal, wherein amplitude adjustment is performed on at least one of the signals in the first interference cancellation signal, and amplitude adjustment is performed on at least one of the signals in the second interference cancellation signal.

4. The method according to claim 1, wherein the performing signal recombination according to the first reference signal and the second reference signal, to obtain a first interference cancellation signal and a second interference cancellation signal comprises:

splitting the first reference signal into a first reference sub-signal and a second reference sub-signal;

performing amplitude adjustment on at least one signal of the first reference sub-signal and the second reference signal; and combining the first reference sub-signal and the second reference signal into the first interference cancellation signal, and using the second reference sub-signal as the second interference cancellation signal.

5. The method according to claim 3, wherein the interfering signals are multipath interfering signals, there are N interference paths, the multipath interfering signals comprise N first interfering signals received by the V polarization receive antenna and N second interfering signals received by the H polarization receive antenna, and the enabling the first interference cancellation signal to pass through a simulated interference channel, so that an amplitude and a delay of the first interference cancellation signal are the same as an amplitude and a delay of the first interfering signal respectively, and a difference between a phase of the first interference cancellation signal and a phase of the first interfering signal is an odd number times 180°, and enabling the second interference cancellation signal to pass through the simulated interference channel, so that an amplitude and a delay of the second interference cancellation signal are the same as an amplitude and a delay of the second interfering signal respectively, and a difference between a phase of the second interference cancellation signal and a phase of the second interfering signal is an odd number times 180° comprises:

splitting each of the first interference cancellation signal and the second interference cancellation signal into N sub-signals; and enabling the N sub-signals that are obtained by splitting the first interference cancellation signal to separately pass through N simulated interference channels corresponding to the N interference paths, so that amplitudes and delays of the N sub-signals that are obtained by splitting the first interference cancellation signal are the same as amplitudes and delays of the N first interfering signals respectively, and differences between phases of the N sub-signals that are obtained by splitting the first interference cancellation signal and phases of the N first interfering signals are an odd number times 180°, and enabling the N sub-signals that are obtained by splitting the second interference cancellation signal to separately pass through the N simulated interference channels corresponding to the N interference paths, so that amplitudes and delays of the N sub-signals that are obtained by splitting the second interference cancellation signal are the same as amplitudes and delays of the N second interfering signals respectively, and differences between phases of the N sub-signals that are obtained by splitting the second interference cancellation signal and phases of the N second interfering signals are an odd number times 180° each; and the method further comprises: recombining, into two interference cancellation signals, the 2N sub-signals that have passed through the simulated interference channels.

6. The method according to claim 1, wherein after the outputting, to a receive link at the local receive end by means of coupling, the first interference cancellation signal and the second interference cancellation signal that have passed through the simulated interference channel, the method further comprises:

acquiring a feedback signal from the local receive end by means of coupling; and adjusting the first interference cancellation signal and the second interference cancellation signal according to the feedback signal.

7. An intra-frequency interference cancellation method, used to cancel multipath interfering signals that are formed by a local transmit end and that interfere a local receive end, wherein there are N interference paths, the multipath interfering signals comprise N first interfering signals received by a V polarization receive antenna and N second interfering signals received by an H polarization receive antenna, comprising:

performing coupling to acquire a first reference signal and a second reference signal from a transmit signal transmitted on a same transmit link at the transmit end, wherein the transmit signal comprises a V polarization signal and an H polarization signal;

splitting each of the first reference signal and the second reference signal into N to 2N reference sub-signals, wherein a total quantity of the reference sub-signals is 3N to 4N;

performing amplitude adjustment on at least N signals of the 3N to 4N reference sub-signals, and combining any two reference sub-signals into one interference cancellation signal, to obtain 2N interference cancellation signals comprising a reference sub-signal that is not combined, wherein the combined two reference sub-signals are reference signals that are from different paths and amplitude adjustment is performed on at least one reference sub-signal of the two reference sub-signals, a proportion of V polarization signals to H polarization signals in N interference cancellation signals meets a first preset proportion, and a proportion of V polarization signals to H polarization signals in the other N interference cancellation signals meets a second preset proportion;

enabling the N interference cancellation signals that meet the first preset proportion to separately pass through N simulated interference channels corresponding to the N interference paths, so that amplitudes and delays of the N interference cancellation signals are the same as amplitudes and delays of the N first interfering signals respectively, and differences between phases of the N interference cancellation signals and phases of the N first interfering signals are an odd number times 180° each, and enabling the other N interference cancellation signals that meet the second preset proportion to separately pass through the N simulated interference channels corresponding to the N interference paths, so that amplitudes and delays of the other N interference cancellation signals are the same as amplitudes and delays of the N second interfering signals respectively, and differences between phases of the other N interference cancellation signals and phases of the N second interfering signals are an odd number times 180° each;

after the simulated interference channels are passed through, recombining the N interference cancellation signals that meet the first preset proportion into a first interference cancellation signal, and recombining the N interference cancellation signals that meet the second preset proportion into a second interference cancellation signal; and outputting the first interference cancellation signal and the second interference cancellation signal to a same receive link at the local receive end by means of coupling, and combining the first interference cancellation signal and the second interference cancellation signal with a signal received by the local receive end.

8. The method according to claim 7, wherein the first reference signal is irrelevant to the second reference signal.

9. The method according to claim 7, wherein after the outputting the first interference cancellation signal and the second interference cancellation signal to a receive link at the local receive end by means of coupling, the method further comprises:

acquiring a feedback signal from the local receive end by means of coupling; and adjusting the first interference cancellation signal and the second interference cancellation signal according to the feedback signal.

10. An intra-frequency interference cancellation apparatus, configured to cancel interfering signals that are formed by a local transmit end and that interfere a local receive end, wherein the interfering signals comprise a first interfering signal received by a V polarization receive antenna and a second interfering signal received by an H polarization receive antenna, comprising:

a first coupler, configured to perform coupling to acquire a first reference signal and a second reference signal from a transmit signal transmitted on a same transmit link at the local transmit end, wherein the transmit signal comprises a V polarization signal and an H polarization signal;

a signal recombiner, configured to perform signal recombination according to the first reference signal and the second reference signal that are acquired by the first coupler by means of coupling, to obtain a first interference cancellation signal and a second interference cancellation signal, wherein a proportion of V polarization signals to H polarization signals in the first interference cancellation signal meets a first preset proportion, and a proportion of V polarization signals to H polarization signals in the second interference cancellation signal meets a second preset proportion;

a channel simulator, configured to adjust the first interference cancellation signal and the second interference cancellation signal that are obtained by the signal recombiner, so that an amplitude and a delay of the first interference cancellation signal are the same as an amplitude and a delay of the first interfering signal respectively, and a difference between a phase of the first interference cancellation signal and a phase of the first interfering signal is an odd number times 180°, and an amplitude and a delay of the second interference cancellation signal are the same as an amplitude and a delay of the second interfering signal respectively, and a difference between a phase of the second interference cancellation signal and a phase of the second interfering signal is an odd number times 180°; and a second coupler, configured to output, to a same receive link at the local receive end by means of coupling, the first interference cancellation signal and the second interference cancellation signal that are adjusted by the channel simulator, and combine the first interference cancellation signal and the second interference cancellation signal with a signal received by the local receive end.

11. The apparatus according to claim 10, wherein the first reference signal is irrelevant to the second reference signal.

12. The apparatus according to claim 10, wherein the signal recombiner comprises:
a first signal splitter, configured to split the first reference signal into a first reference sub-signal and a second reference sub-signal;
a second signal splitter, configured to split the second reference signal into a third reference sub-signal and a fourth reference sub-signal;
at least two attenuators or amplifiers, configured to perform amplitude adjustment on at least two signals of the first reference sub-signal, the second reference sub-signal, the third reference sub-signal, and the fourth reference sub-signal;
a first power combiner, configured to combine the first reference sub-signal and the third reference sub-signal into the first interference cancellation signal, wherein amplitude adjustment is performed by the attenuator or the amplifier on at least one of the signals in the first interference cancellation signal; and
a second power combiner, configured to combine the second reference sub-signal and the fourth reference sub-signal into the second interference cancellation signal, wherein amplitude adjustment is performed by the attenuator or the amplifier on at least one of the signals in the second interference cancellation signal.

13. The apparatus according to claim 10, wherein the signal recombiner comprises:
a first signal splitter, configured to split the first reference signal into a first reference sub-signal and a second reference sub-signal;
at least one attenuator or amplifier, configured to perform amplitude adjustment on at least one signal of the first reference sub-signal and the second reference signal; and
a first power combiner, configured to combine the first reference sub-signal and the second reference signal into the first interference cancellation signal, wherein the second reference sub-signal is used as the second interference cancellation signal.

14. The apparatus according to claim 12, wherein the interfering signals are multipath interfering signals, there are N interference paths, the multipath interfering signals comprise N first interfering signals received by the V polarization receive antenna and N second interfering signals received by the H polarization receive antenna, and the apparatus further comprises:
a third signal splitter, configured to split the first interference cancellation signal into N sub-signals;
a fourth signal splitter, configured to split the second interference cancellation signal into N sub-signals, wherein the channel simulator comprises 2N subunits, wherein N subunits are separately configured to adjust the N sub-signals that are obtained by splitting by the third signal splitter, so that amplitudes and delays of the N sub-signals that are obtained by splitting by the third signal splitter are the same as amplitudes and delays of the N first interfering signals respectively, and differences between phases of the N sub-signals that are obtained by splitting by the third signal splitter and phases of the N first interfering signals are an odd number times 180° each, and the other N subunits are separately configured to adjust the N sub-signals that are obtained by splitting by the fourth signal splitter, so that amplitudes and delays of the N sub-signals that are obtained by splitting by the fourth signal splitter are the same as amplitudes and delays of the N second interfering signals respectively, and differences between phases of the N sub-signals that are obtained by splitting by the fourth signal splitter and phases of the N second interfering signals are an odd number times 180° each; and two power recombiners, configured to recombine, into two interference cancellation signals, the 2N sub-signals that are adjusted by the channel simulator.

15. The apparatus according to claim 10, wherein
the apparatus further comprises: a feedback circuit, configured to perform coupling to acquire a feedback signal from the local receive end, and adjust the first interference cancellation signal and the second interference cancellation signal according to the feedback signal;
the first coupler and the second coupler are both two-port couplers, wherein an included angle θ between two coupling output ports of the first coupler meets 0°<|θ|<180°, and an included angle γ between two coupling output ports of the second coupler meets 0°<|γ|<180°.

16. An intra-frequency interference cancellation apparatus, configured to cancel multipath interfering signals that are formed by a local transmit end and that interfere a local receive end, wherein there are N interference paths, and the multipath interfering signals comprise N first interfering signals received by a V polarization receive antenna and N second interfering signals received by an H polarization receive antenna, comprising:
a first coupler, configured to perform coupling to acquire a first reference signal and a second reference signal from a transmit signal transmitted on a same transmit link at the transmit end, wherein the transmit signal comprises a V polarization signal and an H polarization signal;
two signal splitters, configured to split each of the first reference signal and the second reference signal into N to 2N reference sub-signals, wherein a total quantity of the reference sub-signals is 3N to 4N;
at least N attenuators or amplifiers, configured to perform amplitude adjustment on at least N signals of the 3N to 4N reference sub-signals;
at least N power combiners, configured to combine any two reference sub-signals into one interference cancellation signal, to obtain 2N interference cancellation signals comprising a reference sub-signal that is not combined, wherein the combined two reference sub-signals are reference signals that are from different paths and amplitude adjustment is performed on at least one reference sub-signal of the two reference sub-signals, a proportion of V polarization signals to H polarization signals in N interference cancellation signals meets a first preset proportion, and a proportion of V polarization signals to H polarization signals in the other N interference cancellation signals meets a second preset proportion;
- a channel simulator comprising 2N subunits, wherein N subunits are configured to adjust the N interference cancellation signals that meet the first preset proportion, so that amplitudes and delays of the N interference cancellation signals are the same as amplitudes and delays of the N first interfering signals respectively, and differences between phases of the N interference cancellation signals and phases of the N first interfering signals are an odd number times 180° each, and the other N subunits are configured to adjust the N interference cancellation signals that meet the second preset proportion, so that amplitudes and delays of the N interference cancellation signals are the same as amplitudes and delays of the N second interfering signals respectively, and differences between phases of the N interference cancellation signals and phases of the N second interfering signals are an odd number times 180° each;
- a first power recombiner, configured to recombine the N interference cancellation signals that meet the first preset proportion into a first interference cancellation signal;
- a second power recombiner, configured to recombine the N interference cancellation signals that meet the second preset proportion into a second interference cancellation signal; and
- a second coupler, configured to output the first interference cancellation signal and the second interference cancellation signal to a same receive link at the local receive end by means of coupling, and combine the first interference cancellation signal and the second interference cancellation signal with a signal received by the local receive end.

17. The apparatus according to claim 16, wherein the first reference signal is irrelevant to the second reference signal.

18. The apparatus according to claim 16, wherein
the apparatus further comprises: a feedback circuit, configured to perform coupling to acquire a feedback signal from the local receive end, and adjust the first interference cancellation signal and the second interference cancellation signal according to the feedback signal;
the first coupler and the second coupler are both two-port couplers, wherein an included angle θ between two coupling output ports of the first coupler meets 0°<|θ|<180°, and an included angle γ between two coupling output ports of the second coupler meets 0°<|γ|<180°.

19. An intra-frequency interference cancellation system, comprising: a transmit polarization combiner that combines a V polarization signal and an H polarization signal into a transmit signal; a local dual polarization transmit antenna that transmits the transmit signal obtained by combination by the transmit polarization combiner; a local dual polarization receive antenna that is interfered by the transmit signal of the local dual polarization transmit antenna; and a receive polarization combiner that splits a received signal received by the local dual polarization receive antenna into a V polarization signal and an H polarization signal; and
further comprising: the intra-frequency interference cancellation apparatus according to claim 10, wherein a first coupler of the intra-frequency interference cancellation apparatus is connected to a same transmit link between the transmit polarization combiner and the local dual polarization transmit antenna, and a second coupler of the intra-frequency interference cancellation apparatus is connected to a same receive link between the receive polarization combiner and the local dual polarization receive antenna;
wherein the transmit polarization combiner is connected to the local dual polarization transmit antenna by using any transmission line that can transmit a V polarization signal and an H polarization signal simultaneously; wherein the receive polarization combiner is connected to the local dual polarization receive antenna by using any transmission line that can transmit a V polarization signal and an H polarization signal simultaneously, wherein the transmission line comprises a circular waveguide.

20. An intra-frequency interference cancellation system, comprising: a transmit polarization combiner that combines a V polarization signal and an H polarization signal into a transmit signal; a local dual polarization transmit antenna that transmits the transmit signal obtained by combination by the transmit polarization combiner; a local dual polarization receive antenna that is interfered by the transmit signal of the local dual polarization transmit antenna; and a receive polarization combiner that splits a received signal received by the local dual polarization receive antenna into a V polarization signal and an H polarization signal; and
further comprising: the intra-frequency interference cancellation apparatus according to claim 16, wherein a first coupler of the intra-frequency interference cancellation apparatus is connected to a same transmit link between the transmit polarization combiner and the local dual polarization transmit antenna, and a second coupler of the intra-frequency interference cancellation apparatus is connected to a same receive link between the receive polarization combiner and the local dual polarization receive antenna;
wherein the transmit polarization combiner is connected to the local dual polarization transmit antenna by using any transmission line that can transmit a V polarization signal and an H polarization signal simultaneously; wherein the receive polarization combiner is connected to the local dual polarization receive antenna by using any transmission line that can transmit a V polarization signal and an H polarization signal simultaneously; wherein the transmission line comprises a circular waveguide.

* * * * *